United States Patent
Mok et al.

(10) Patent No.: US 8,322,457 B2
(45) Date of Patent: Dec. 4, 2012

(54) POWER TOOL CHUCK ASSEMBLY WITH HAMMER MECHANISM

(75) Inventors: Kwok Ting Mok, Hong Kong (CN); Xian Guo Zhao, Dongguan (CN); Zhi Liu Gu, Dongguan (CN)

(73) Assignee: Techtronic Power Tools Technology Limited, Tortola (VG)

( * ) Notice: Subject to any disclaimer, the term of this patent is extended or adjusted under 35 U.S.C. 154(b) by 385 days.

(21) Appl. No.: 12/700,931

(22) Filed: Feb. 5, 2010

(65) Prior Publication Data

US 2010/0193207 A1 Aug. 5, 2010

Related U.S. Application Data

(60) Provisional application No. 61/150,120, filed on Feb. 5, 2009.

(51) Int. Cl.
*B23B 45/16* (2006.01)
(52) U.S. Cl. .............. 173/48; 173/90; 173/47; 173/93.5
(58) Field of Classification Search ............ 173/48, 173/90, 47, 93.5
See application file for complete search history.

(56) References Cited

U.S. PATENT DOCUMENTS

| | | | |
|---|---|---|---|
| 4,229,981 A | 10/1980 | Macky | |
| 4,702,485 A * | 10/1987 | Rohm | 279/19.4 |
| 5,882,153 A | 3/1999 | Mack et al. | |
| 5,927,914 A | 7/1999 | Mack et al. | |
| 6,142,242 A | 11/2000 | Okumura et al. | |
| RE37,905 E | 11/2002 | Bourner et al. | |
| 6,892,827 B2 | 5/2005 | Toyama et al. | |
| 7,073,608 B2 | 7/2006 | Droste | |
| 7,201,235 B2 | 4/2007 | Umemura et al. | |
| 7,410,007 B2 | 8/2008 | Chung et al. | |
| 2001/0035292 A1* | 11/2001 | Bieber et al. | 173/178 |
| 2003/0173097 A1* | 9/2003 | Holzer et al. | 173/178 |
| 2006/0185870 A1* | 8/2006 | Gehret et al. | 173/217 |
| 2006/0213675 A1 | 9/2006 | Whitmire et al. | |
| 2006/0237205 A1* | 10/2006 | Sia et al. | 173/48 |
| 2007/0068692 A1* | 3/2007 | Puzio | 173/217 |
| 2007/0131439 A1* | 6/2007 | Hashimoto et al. | 173/48 |
| 2007/0181319 A1 | 8/2007 | Whitmine et al. | |
| 2008/0271905 A1 | 11/2008 | Yoshikane | |
| 2009/0003950 A1 | 1/2009 | Mok et al. | |
| 2009/0101376 A1 | 4/2009 | Walker et al. | |
| 2009/0114410 A1* | 5/2009 | Van Der Linde et al. | 173/20 |

FOREIGN PATENT DOCUMENTS

| | | |
|---|---|---|
| CN | 201015864 Y | 2/2008 |
| CN | 201175900 Y | 1/2009 |
| CN | 201224088 Y | 4/2009 |
| DE | 20305853 U1 | 9/2003 |
| EP | 1652630 A2 | 5/2006 |
| GB | 2333729 A | 8/1999 |

\* cited by examiner

*Primary Examiner* — Brian D Nash
(74) *Attorney, Agent, or Firm* — Michael Best & Friedrich LLP

(57) ABSTRACT

A power tool includes a housing, a motor supported in the housing, a chuck assembly having a chuck body rotatable about a central axis in response to torque received from the motor, and a plurality of jaws supported in the chuck body. Each of the jaws includes a front portion operable to grasp a tool element and a rear portion positioned outside the chuck body. The power tool also includes a hammer mechanism operable to impart movement to the chuck assembly, in a direction parallel to the central axis, during rotation of the chuck assembly about the central axis.

33 Claims, 16 Drawing Sheets

POWER TOOL CHUCK ASSEMBLY WITH HAMMER MECHANISM

CROSS-REFERENCE TO RELATED APPLICATIONS

This application claims priority to U.S. Provisional Patent Application No. 61/150,120 filed on Feb. 5, 2009, the entire contents of which is incorporated herein by reference.

FIELD OF THE INVENTION

The present invention relates to power tools, and more particularly to power tools with hammer mechanisms.

BACKGROUND OF THE INVENTION

Power tools having a rotational output (e.g., drills) typically include chuck assemblies including a plurality of jaws that are adjustable to secure therebetween a power tool element (e.g., a drill bit). Such chuck assemblies include a sleeve that is rotatable relative to a chuck body to cause the jaws to extend from the chuck body and to retract into the chuck body when adjusting the jaws to secure a particular tool element to the power tool. The chuck body of these power tools is typically long enough to contain the entire length of each of the jaws when completely retracted into the chuck body, resulting in a relatively long chuck assembly. This, in turn, often makes the power tool more difficult to maneuver and use.

SUMMARY OF THE INVENTION

The present invention provides, in one aspect, a power tool including a housing, a motor supported in the housing, a chuck assembly having a chuck body rotatable about a central axis in response to torque received from the motor, and a plurality of jaws supported in the chuck body. Each of the jaws includes a front portion operable to grasp a tool element and a rear portion positioned outside the chuck body. The power tool also includes a hammer mechanism operable to impart movement to the chuck assembly, in a direction parallel to the central axis, during rotation of the chuck assembly about the central axis.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
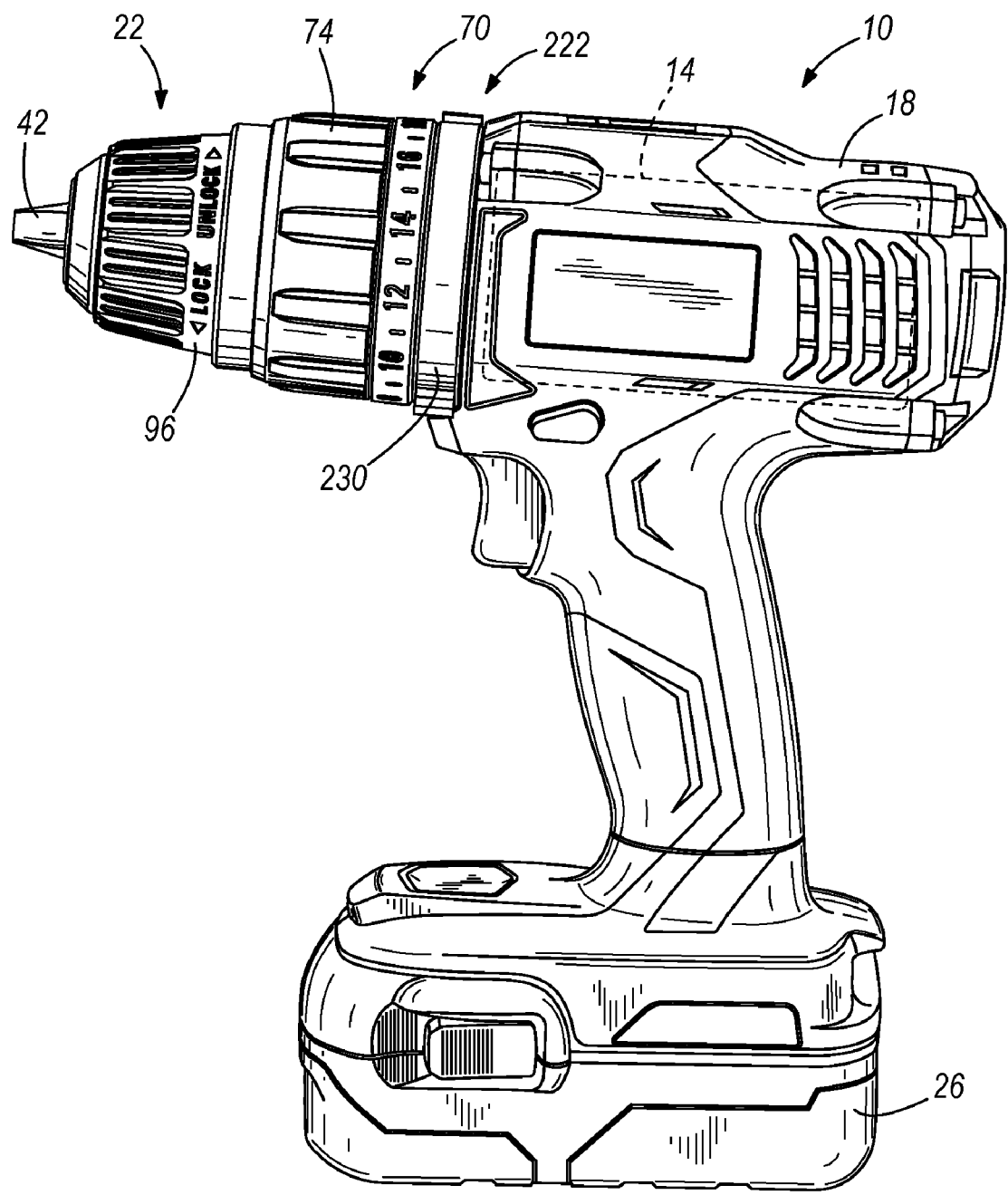
FIG. 1 is a side view of a power tool incorporating a chuck assembly and a hammer mechanism according to one embodiment of the invention.

FIG. 1 illustrates a power tool 10, according to one embodiment of the invention, including an electric motor 14, a housing 18 in which the electric motor is supported, and a rotational output 22 operable to perform work on a workpiece. In the illustrated embodiment of the power tool 10, the power tool 10 is configured as a drill operable to receive a tool bit to perform work on a workpiece (e.g., a drill bit, a screw bit, etc.). Alternatively, the power tool 10 may be configured as any of a number of different tools having a rotational output (e.g., a grinder, router, etc.).

With continued reference to FIG. 1, the housing 18 supports the electric motor 14 and a battery 26 electrically connected to the motor 14. The battery 26 may be configured having any of a number of different voltages (e.g., 4 volts, 12 volts, 18 volts, etc.) depending upon the range of applications of the power tool 10 and may utilize any of a number of different chemistries (e.g., lithium-ion, nickel-cadmium, etc.). The battery 26 is also removable from the housing 18 for charging by a separate battery charger. However, in another embodiment of the power tool 10, the battery 26 may be enclosed within the housing 18 and non-removable from the power tool 10. In such an embodiment, the power tool 10 may also incorporate a battery charging circuit to charge the internal battery. Alternatively, the power tool 10 may include a power cord (not shown) to electrically connect the motor 14 to a remote power source (e.g., household line alternating current available from a power outlet) rather than incorporating an onboard direct current power source (i.e., the battery 26). The battery 26 may also be interchangeable with a variety of other power tools to supply power to the power tools (e.g., saws, flashlights, etc.).

Figure 2:
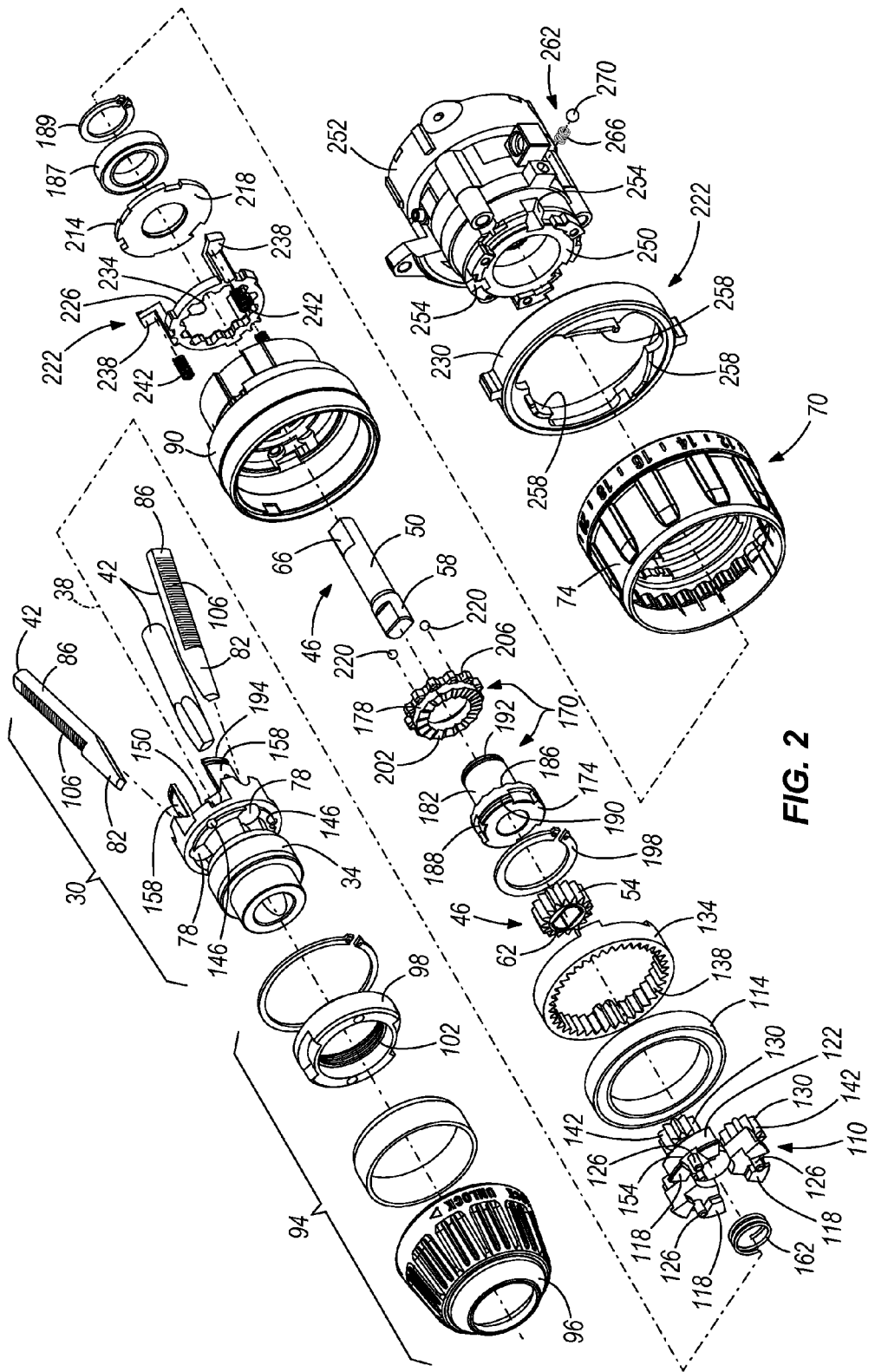
FIG. 2 is an exploded perspective view of a portion of the power tool of FIG. 1.
Figure 3:
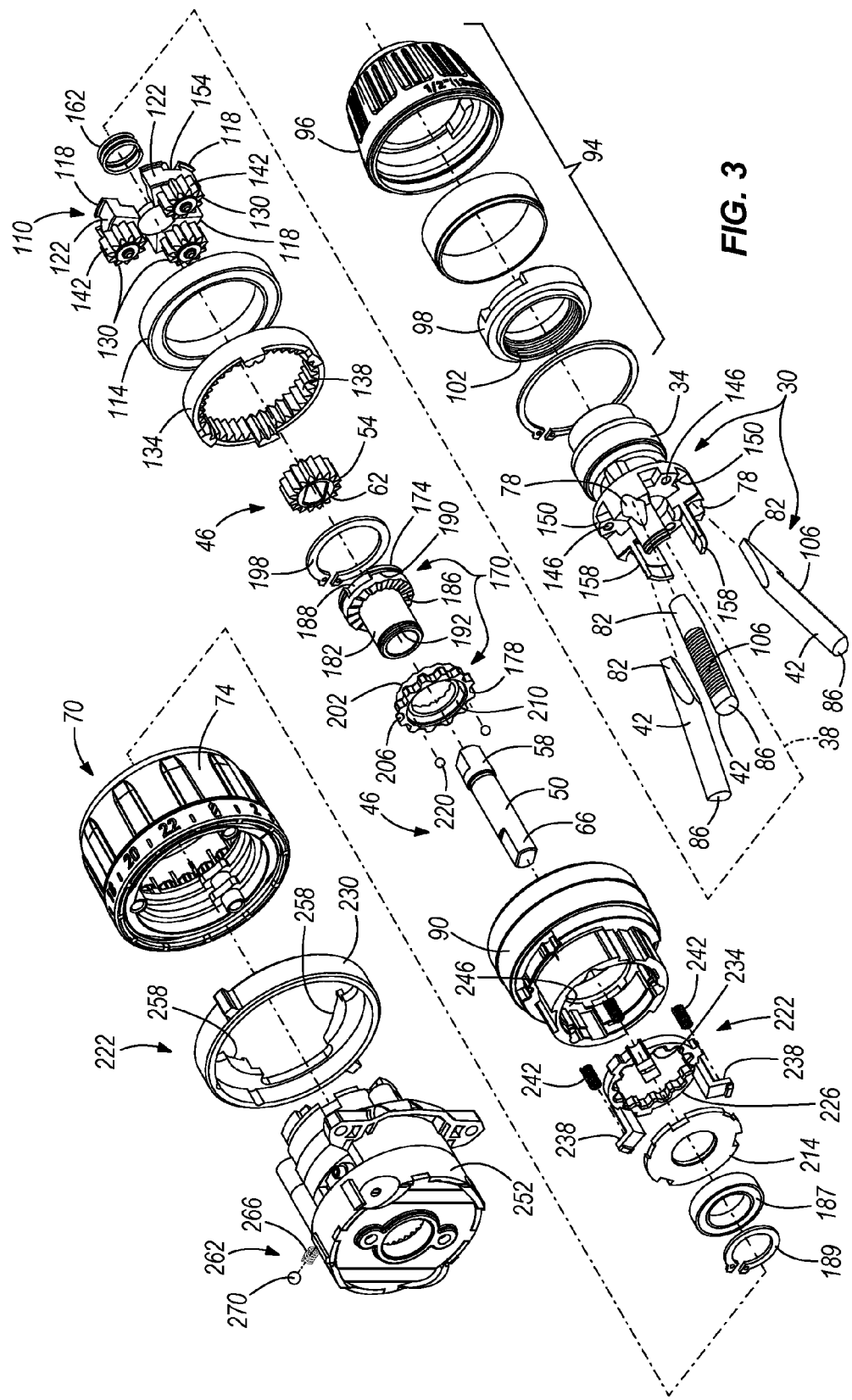
FIG. 3 is a reverse, exploded perspective view the portion of the power tool of FIG. 2.

With reference to FIGS. 2 and 3, the power tool 10 includes a chuck assembly 30 (i.e., the rotational output 22) having a chuck body 34 rotatable about a central axis 38 in response to torque received from the motor 14 and jaws 42 supported in the chuck body 34. In the illustrated embodiment of the power tool 10, a pinion 46 is utilized to transfer torque from the motor 14 to the chuck assembly 30. The pinion 46 includes a pinion shaft 50 and a pinion gear 54 fixed for co-rotation with the pinion shaft 50. A first end 58 of the pinion shaft 50 includes a non-circular cross-section (e.g., a cylinder having opposed flats), and the pinion gear 54 includes a corresponding non-circular aperture 62 in which the first end 58 of the pinion shaft 50 is received. Any of a number of different components or processes (e.g., fasteners, welding, using an interference fit, etc.) may be utilized to secure the pinion gear 54 to the first end 58 of the pinion shaft 50. Alternatively, the pinion gear 54 and the pinion shaft 50 may be integrally formed as a single piece to create a one-piece pinion.

Although not shown in FIGS. 2 and 3, the power tool 10 may include a transmission operably coupling a second end 66 of the pinion shaft 50 and the motor 14 to reduce the rotational speed of the pinion 46 relative to the output shaft of the motor 14, and to increase the amount of torque transferred to the pinion 46 from the output shaft of the motor 14. Such a transmission (e.g., including one or more offset gears or planetary geartrain arrangements) may be similar to the power tool transmissions disclosed in published U.S. Patent Publication No. 2009/0003949, or published U.S. Patent Publication No. 2009/0003950, the entire contents of which are incorporated herein by reference. With reference to FIG. 1, the power tool 10 also includes a torque adjustment mechanism 70 operable to allow a user of the power tool 10 to adjust the amount of torque that the chuck assembly 30 is capable of applying to a workpiece. In the illustrated embodiment, the torque adjustment mechanism 70 includes a ring or sleeve 74 surrounding a rear portion of the chuck assembly 30, which is rotatable with respect to the power tool housing 18 to adjust the amount of torque that the chuck assembly is capable of applying to a workpiece. Such a torque adjustment mechanism is described in more detail in published U.S. Patent Publication No. 2009/0003949, the entire contents of which is incorporated herein by reference.

Figure 6:
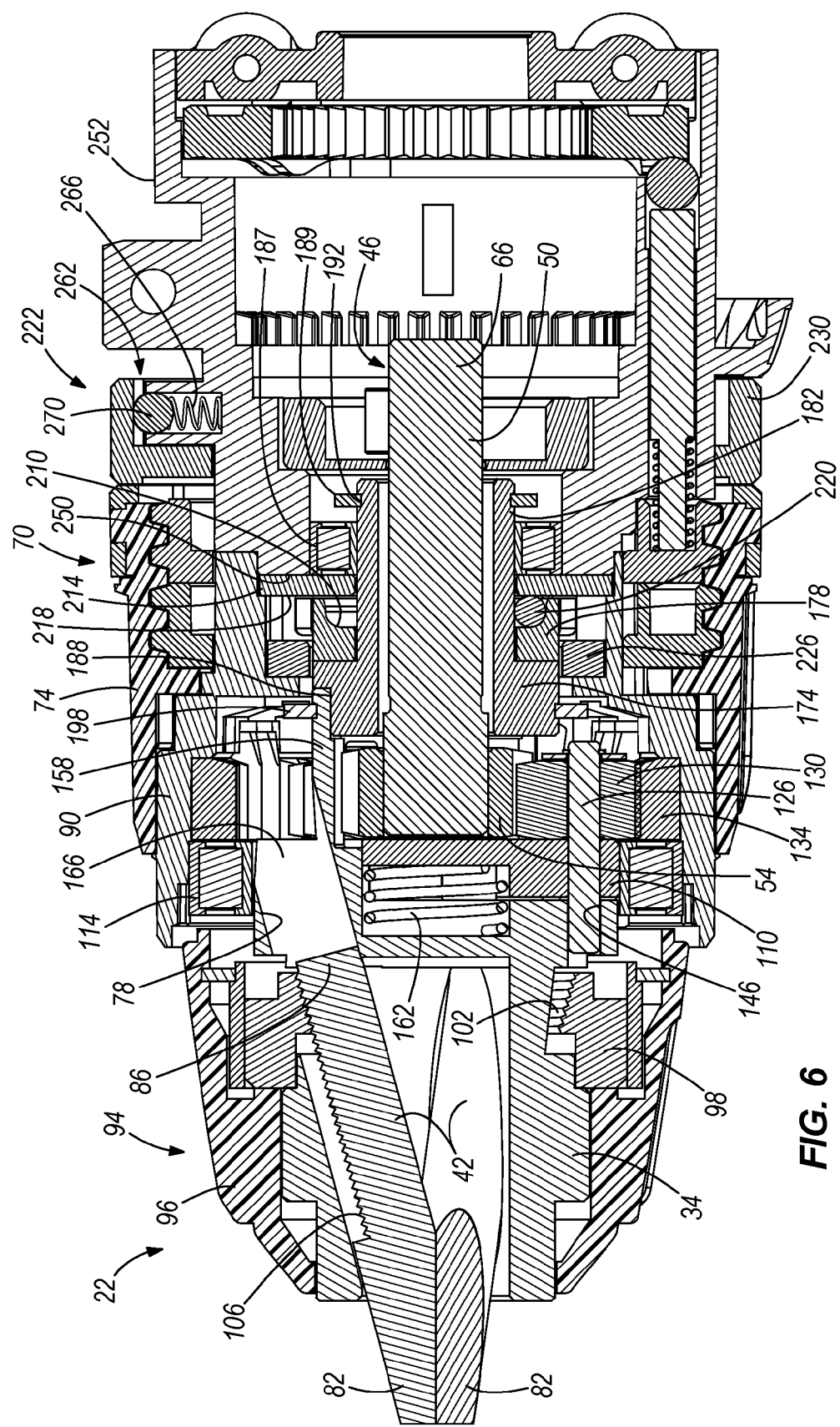
FIG. 6 is a cross-sectional view of the power tool of FIG. 1 through line 6-6 in FIG. 4, illustrating the hammer mechanism disabled.
Figure 7:
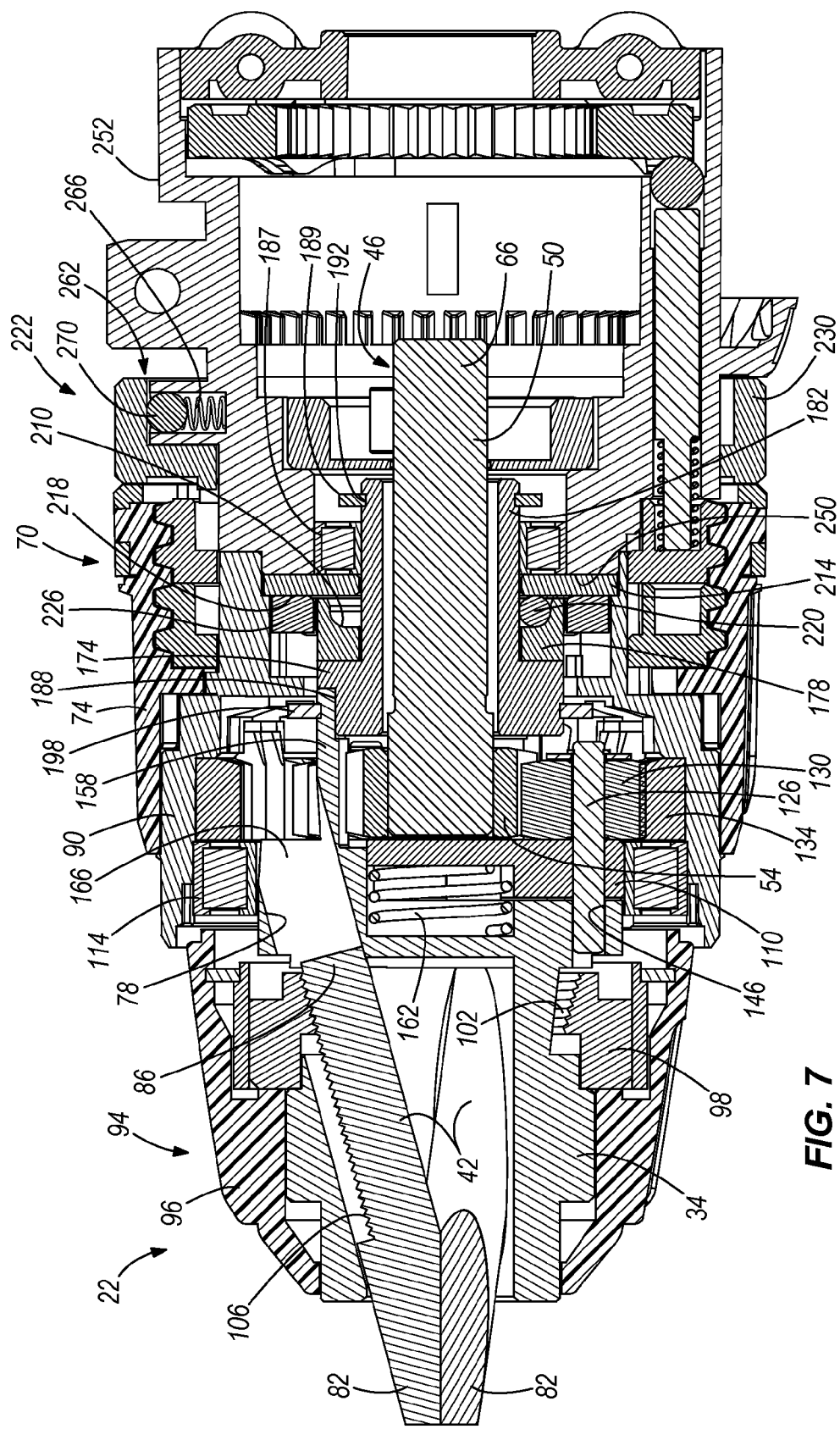
FIG. 7 is a cross-sectional view of the power tool of FIG. 1 through line 7-7 in FIG. 5, illustrating the hammer mechanism enabled and the chuck assembly in a retracted or rearward position.
Figure 8:
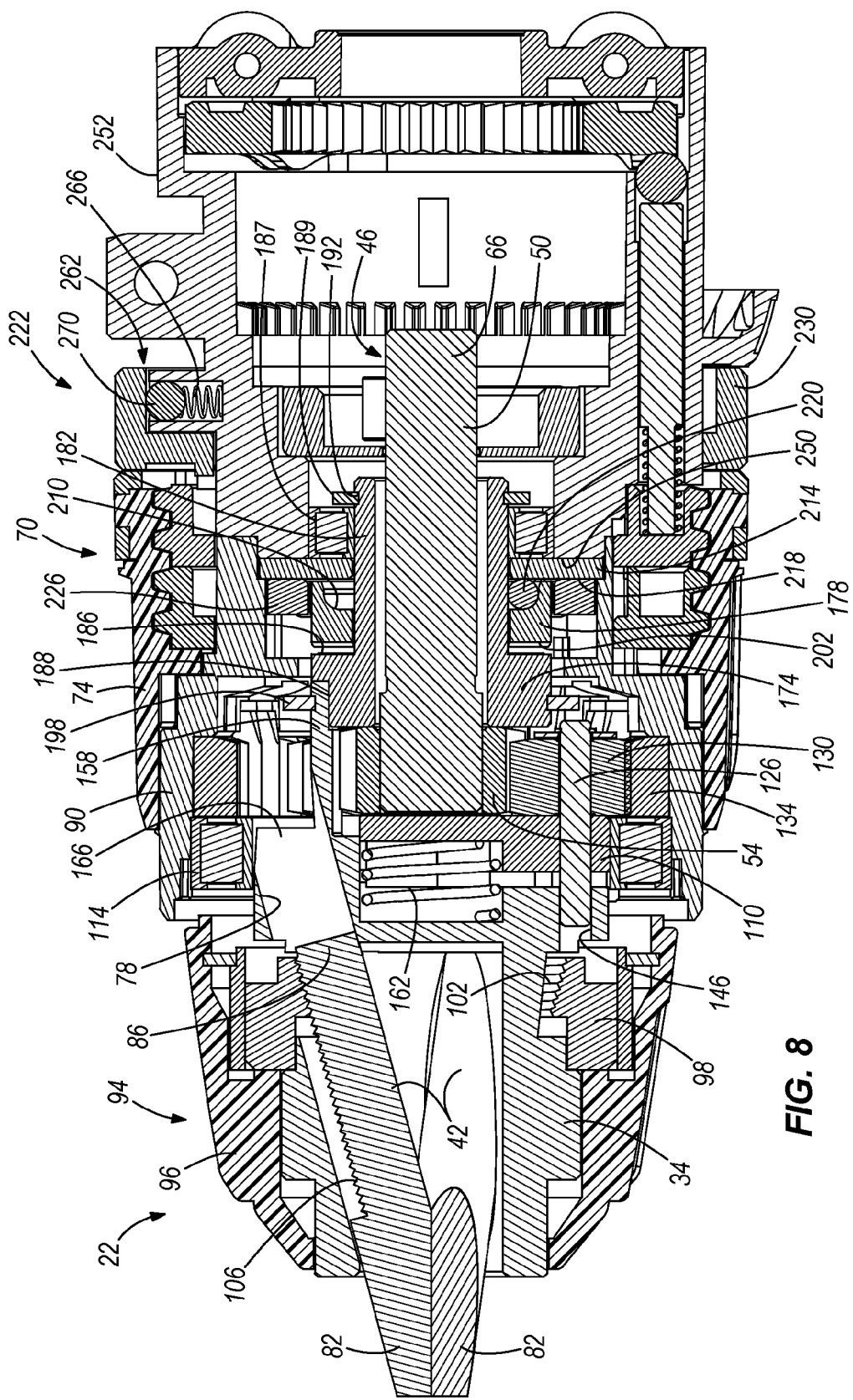
FIG. 8 is a cross-sectional view of the power tool of FIG. 1, illustrating the hammer mechanism enabled and the chuck assembly in an extended or forward position.

With reference to FIGS. 2 and 3, the chuck body 34 includes bores 78 in which the respective jaws 42 are received. Each of the bores 78 is oriented at an oblique angle relative to the central axis 38 of the chuck body 34, such that front portions or tips 82 of the respective jaws 42 move toward each other or converge on the central axis 38 when the jaws 42 extend from the chuck body 34 to secure a tool bit. Likewise, the front portions or tips 82 of the jaws 42 move away from each other or diverge from the central axis 38 when the jaws 42 retract into the chuck body 34 to release the tool bit. With reference to FIGS. 6-8, rear portions 86 of the respective jaws 42 are positioned outside of the chuck body 34 when the jaws 42 are fully extended and fully retracted relative to the chuck body 34. The rear portions 86 of the jaws 42, in turn, are positioned inside a first transmission housing portion 90 of the power tool 10 (described in more detail below). This arrangement of the jaws 42 with respect to the chuck body 34 allows the overall length of the chuck body 34 to be decreased compared to a chuck body in a conventional drill, which is typically long enough to contain the entire length of each of the jaws when completely retracted into the chuck body. As such, the overall length of the power tool 10 is decreased, allowing for increased maneuverability of the power tool 10. Additional benefits and features of shortened chuck assemblies, similar to the chuck assembly 30 disclosed in the present application, are disclosed in published U.S. Patent Publication No. 2009/0003949 and published U.S. Patent Publication No. 2009/0003950, the entire contents of which are incorporated herein by reference.

With reference to FIGS. 2 and 3, the chuck assembly 30 includes a sleeve assembly 94 positioned over a front portion of the chuck body 34 to facilitate the extension and retraction of the jaws 42 relative to the chuck body 34. Specifically, the sleeve assembly 94 includes an outer sleeve 96 and a ring 98, positioned within and secured to the outer sleeve 96, having threads 102 formed on an inner peripheral surface of the ring 98. Each of the jaws 42 includes corresponding threads 106 on a radially outward-facing surface of the jaws 42, which engage the threads 102 on the ring 98. Further, the sleeve assembly 94 is rotatably coupled to the chuck body 34 and axially secured to the chuck body 34, such that the sleeve assembly 94 may be rotated relative to the chuck body 34 but does not move axially (i.e., along the central axis 38) relative to the chuck body 34. As a result, rotation of the sleeve assembly 94 relative to the chuck body 34 in a first direction about the central axis 38 causes the front portions or tips 82 of the jaws 42 to extend from the chuck body 34, while rotation of the sleeve assembly 94 relative to the chuck body 34 in a second or opposite direction about the central axis 38 causes the front portions or tips 82 of the jaws 42 to retract into the chuck body 34. Alternatively, the threads 102 on the inner peripheral surface of the ring 98 may be integrally formed with the outer sleeve 96 to actuate the jaws 42.

With reference to FIGS. 2 and 3, the power tool 10 also includes a carrier 110 and a bearing 114 (e.g., a roller bearing) supporting the carrier 110 for rotation relative to the housing 18. In turn, the carrier 110 is rotatable about the central axis 38 in response to torque received from the motor 14 to rotatably support the chuck assembly 30 about the central axis 38. In the illustrated embodiment, the carrier 110 includes three radially outwardly-extending arms 118, each of which includes a radially outwardly-facing surface 122 that is engaged by the bearing 114 and a projection or axle 126 extending through the arm 118 in a direction substantially parallel with the central axis 38. The carrier 110 also includes a gear 130 rotatably supported on each axle 126 on one side of the carrier 110. The power tool 10 also includes an outer ring gear 134 having radially inwardly-projecting teeth 138 that engage corresponding teeth 142 on each of the carrier gears 130. The pinion gear 54 is centrally positioned relative to the carrier gears 130 and is engaged with each of the carrier gears 130 such that rotation of the pinion gear 54 causes each of the carrier gears 130 to rotate about its respective axle 126 and about the central axis 38 relative to the outer ring gear 134.

With continued reference to FIGS. 2 and 3, the chuck body 34 includes apertures 146 in which a respective axle 126 of the carrier 110 is slidably received to support the chuck body 34. In addition, the chuck body 34 includes raised bosses 150 in which the respective apertures 146 are formed, and the carrier 110 includes grooves or recesses 154 corresponding to the raised bosses 150 into which the raised bosses 150 are received. The chuck body 34 further includes axially-extending tabs 158 positioned between adjacent arms 118 of the carrier 110. A combination of positioning the carrier axles 126 in the respective apertures 146 in the chuck body 34, positioning the raised bosses 150 on the chuck body 34 in the respective grooves or recesses 154 of the carrier 110, and positioning the axially-extending tabs 158 of the chuck body 34 between adjacent arms 118 of the carrier 110 rotationally interlocks the chuck body 34 and the carrier 110 such that the chuck body 34 and the carrier 110 co-rotate during operation of the power tool 10.

With continued reference to FIGS. 2 and 3, the power tool 10 also includes a resilient member 162 (e.g., a spring) positioned between the chuck body 34 and the carrier 110 to at least partially impart reciprocating motion of the chuck assembly 30 relative to the carrier 110 during operation of the power tool 10 (discussed in more detail below). In the illustrated embodiment of the power tool 10, the spring 162 is configured as a compression spring having its opposite ends contacting the chuck body 34 and the carrier 110, respectively, such that the bias of the spring 162 pushes the chuck body 34 away from the carrier 110. Any of a number of different components or processes may be utilized to attach the opposite ends of the spring 162 to the chuck body 34 and of the carrier 110, respectively (e.g., using fasteners, welding, adhesives, etc.). Alternatively, the ends of the spring 162 may not be attached to the chuck body 34 and the carrier 110, respectively.

With continued reference to FIGS. 2 and 3, the rear portions 86 of the respective jaws 42 extend within the gaps formed between adjacent arms 118 of the carrier 110 when the respective jaws 42 are fully retracted relative to the chuck body 34. When the bearing 114 is coupled to the carrier 110 (e.g., see FIGS. 6-8 in which the jaws 42 are fully extended), a combination of the bearing 114 and adjacent arms 118 of the carrier 110 form respective apertures 166 through which the rear portions 86 of the jaws 42 extend when the jaws are fully retracted relative to the chuck body 34. Alternatively, the carrier 110 may include another set of apertures through which the rear portions 86 of the jaws 42 extend, rather than the apertures 166 which coincide with the gaps between adjacent arms 118 of the carrier 110.

With continued reference to FIGS. 2 and 3, the power tool 10 also includes a hammer mechanism 170 operable to impart movement to the chuck assembly 30, in a direction parallel to the central axis 38, during rotation of the chuck assembly 30 about the central axis 38. The hammer mechanism 170 includes a first ratchet 174 coupled for co-rotation with the chuck body 34 about the central axis 38 and a second ratchet 178 in facing relationship with the first ratchet 174. The first ratchet 174 includes a tubular shaft 182 through which the pinion shaft 50 is positioned and axially-extending teeth 186 positioned around the tubular shaft 182. The first ratchet 174 is rotatably supported in a second housing portion 252 of the power tool 10 by a bearing 187. A clip 189 is positioned within a groove 192 in the tubular shaft 182 to provide a limit as to the extent of axial movement the first ratchet 174 may undergo. The first ratchet 174 also includes axially-extending slots 188 into which the respective tabs 158 of the chuck body 34 are slidably received. The circumferential length of each of the tabs 158 is nominally equal to that of the slots 188, such that the first ratchet 174 is substantially rotationally interlocked to the chuck body 34 when the tabs 158 are received in the slots 188.

The first ratchet 174 further includes a groove 190 formed in a radially outwardly-facing surface of the ratchet 174 adjacent the teeth 186. Each of the axially-extending tabs 158 on the chuck body 34 also includes a groove 194 formed in a radially outwardly-facing surface of the tabs 158 (FIG. 2). The grooves 190 in the first ratchet 174 and the respective grooves 194 in the axially-extending tabs 158 are aligned, and a clip 198 is inserted into the respective grooves 190, 194 to non-rotatably couple or fix the first ratchet 174 to the chuck body 34 (see also FIGS. 6-8). Alternatively, any of a number of different components or processes may be utilized to fix the first ratchet 174 to the chuck body 34 for co-rotation (e.g., using fasteners, welding, adhesives, etc.). As a further alternative, the chuck body 34 and the first ratchet 174 may be integrally formed on a single piece.

With reference to FIGS. 2 and 3, the second ratchet 178 includes axially-extending teeth 202 arranged about the central axis 38 in a corresponding manner to the teeth 186 of the first ratchet 174. The spring 162 biases the chuck assembly 30 and the first ratchet 174 axially away from the second ratchet 178 such that the teeth 186, 202 of the first and second ratchets 174, 178, respectively, are disengaged when the rotational output 22 of the power tool 10 is not pressed against a workpiece. The second ratchet 178 also includes radially outwardly-extending teeth 206 arranged about the central axis 38 and a recess 210 (FIG. 3) formed in the side of the second ratchet 178 opposite the teeth 202, the purpose of both of which is described in detail below. The hammer mechanism 170 further includes a plate or washer 214 having a bearing surface 218 in facing relationship with the side of the second ratchet 178 opposite the teeth 202. Bearings 220 (e.g., ball bearings) are positioned in the recess 210 between the second ratchet 178 and the washer 214 to facilitate rotation of the second ratchet 178 relative to the washer 214. Alternatively, any of a number of different components may be utilized to facilitate rotation of the second ratchet 178 relative to the washer 214.

With continued reference to FIGS. 2 and 3, the power tool 10 further includes a mode selector assembly 222 having a ratchet-engaging member 226 movable between a first position, in which the hammer mechanism 170 is enabled (FIG. 5), and a second position, in which the hammer mechanism 170 is disabled (FIG. 4), and an actuator 230 operable to move the ratchet-engaging member 226 between the first position and the second position. With reference to FIGS. 2 and 3, the ratchet-engaging member 226 includes radially inwardly-extending teeth 234 that are selectively engaged with the radially outwardly-extending teeth 206 of the second ratchet 178 to rotationally interlock the second ratchet 178 and the ratchet-engaging member 226. Alternatively, the second ratchet 178 and ratchet-engaging member 226 may include any of a number of different structures or features rather than the inter-engaging teeth 206, 234 to rotationally interlock the second ratchet 178 and the ratchet-engaging member 226. The ratchet-engaging member 226 also includes radially outwardly-extending feet or spring perches 238, the purpose of which is described in detail below.

Figure 4:
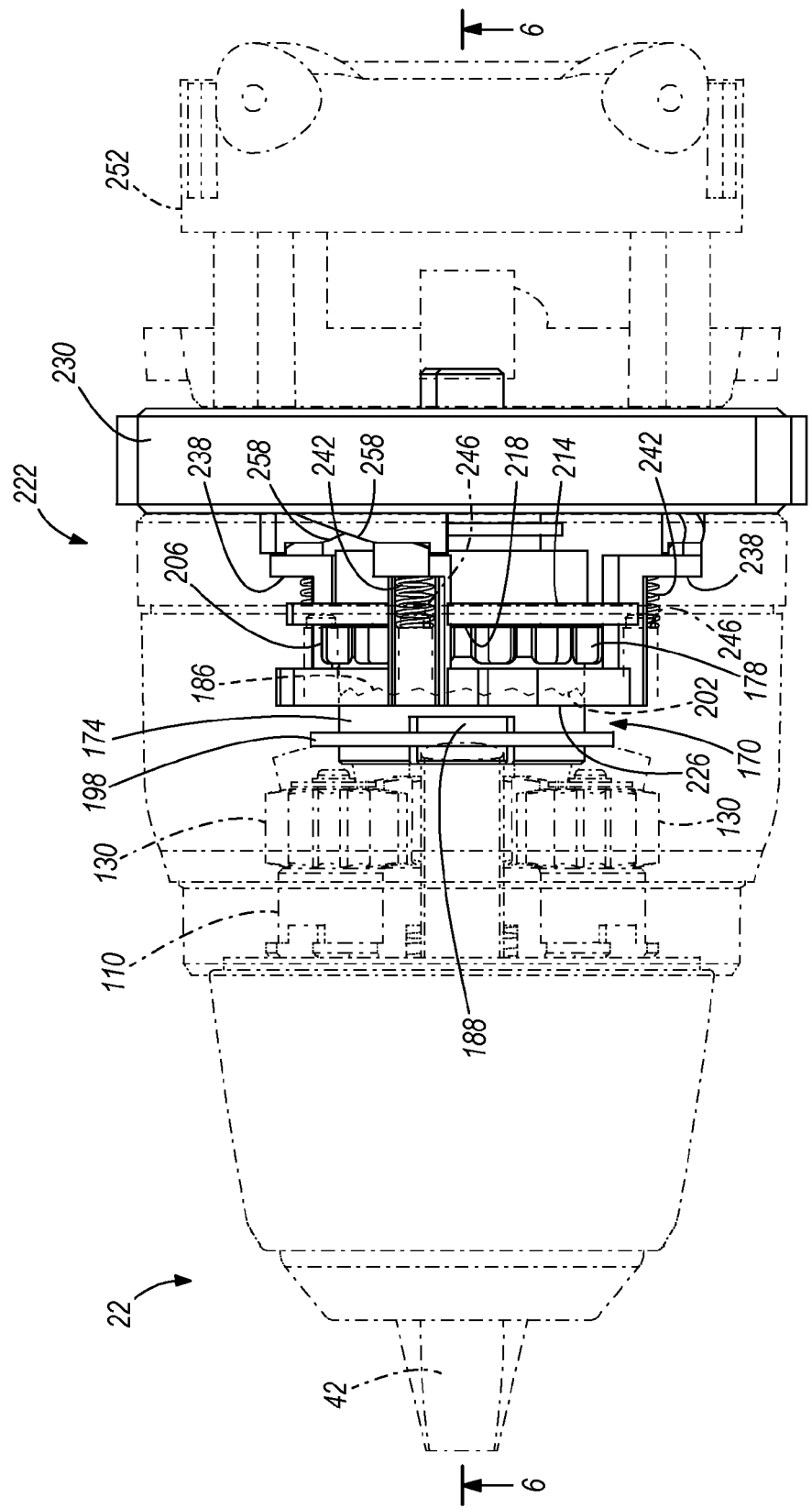
FIG. 4 is a side view of the hammer mechanism and a mode selector assembly of the power tool of FIG. 1, illustrating the hammer mechanism disabled.
Figure 5:
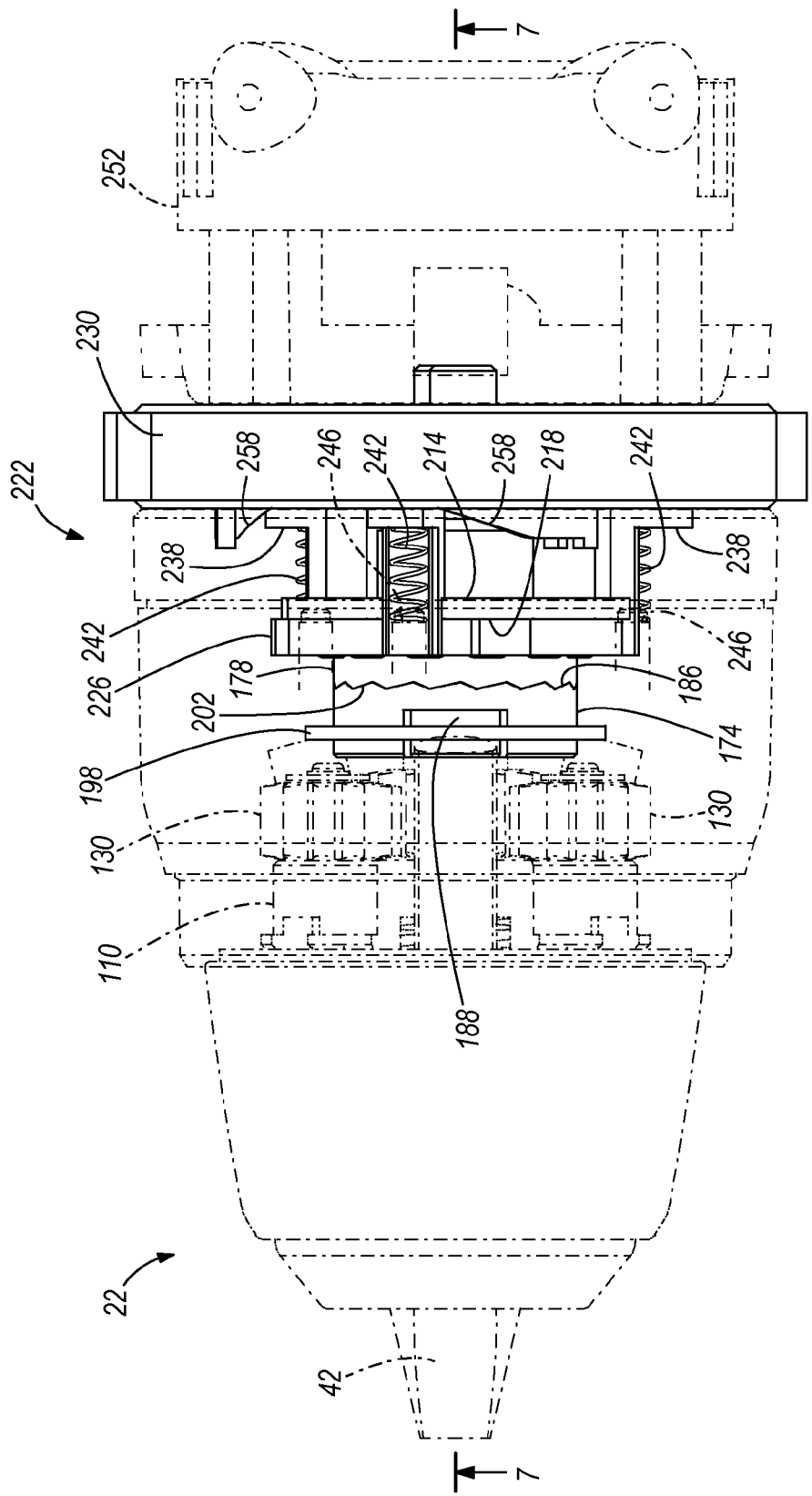
FIG. 5 is a side view of the hammer mechanism and mode selector assembly of the power tool of FIG. 1, illustrating the hammer mechanism enabled.

With reference to FIGS. 4 and 5, the mode selector assembly 222 also includes resilient members 242 (e.g., compression springs) positioned between the respective spring perches 238 of the ratchet-engaging member 226 and an interior surface 246 of the front transmission housing portion 90. In the illustrated embodiment of the mode selector assembly 222, the springs 242 bias the ratchet-engaging member 226 toward its first position in which the hammer mechanism is enabled. More particularly, the springs 242 bias the ratchet-engaging member 226 toward the second ratchet 178 such that the teeth 234 of the ratchet-engaging member 226 interlock or engage the teeth 206 of the second ratchet 178 (FIG. 5). However, the springs 242 may be compressed while moving the ratchet-engaging member 226 axially away from the second ratchet 178 such that the teeth 234 of the ratchet-engaging member 226 disengage the teeth 206 of the second ratchet 178 to allow the second ratchet 178 to rotate relative to the ratchet-engaging member 226 (FIG. 4).

With reference to FIGS. 2 and 3, the washer 214 is positioned adjacent a facing surface 250 of the second transmission housing portion 252 (see also FIGS. 6-8). The second transmission housing portion 252 also includes slots 254 that receive the respective spring perches 238 of the ratchet-engaging member 226 (FIGS. 2 and 3). The slots 254 facilitate movement of the ratchet-engaging member 226 along the central axis 38, but prevent rotation of the ratchet-engaging member 226 about the central axis 38 relative to the housing portion 252. The actuator 230 of the mode selector assembly 222 includes inclined surfaces or ramps 258 positioned adjacent the respective spring perches 238 of the ratchet-engaging member 226. With reference to FIG. 5, the actuator 230 is positionable relative to the second transmission housing portion 252 such that the ramps 258 do not engage the respective spring perches 238 of the ratchet-engaging member 226, thereby allowing the springs 242 to bias the ratchet-engaging member toward the second ratchet such that the teeth of the ratchet-engaging member 226 interlock or engage the teeth 206 of the second ratchet 178. As will be explained in greater detail below, in this position of the actuator 230 relative to the second transmission housing portion 252, the second ratchet 178 is prevented from co-rotating with the first ratchet 174, thereby causing the teeth 186 of the first ratchet 174 to incrementally slide over the teeth 202 of the second ratchet 178. This sliding movement of the first ratchet 174 relative to the second ratchet 178 causes the first ratchet 174 and the attached chuck assembly 30 to incrementally displace or translate along the central axis 38 in a reciprocating manner.

With reference to FIG. 4, the actuator 230 is also positionable relative to the second transmission housing portion 252 such that the ramps 258 engage the respective spring perches 238 of the ratchet-engaging member 226, thereby causing the ratchet-engaging member 226 to move away from the second ratchet 178 such that the teeth 234 of the ratchet-engaging member 226 disengage the teeth 206 of the second ratchet 178. As will be explained in greater detail below, in this position of the actuator 230 relative to the second transmission housing portion 252, the second ratchet 178 is allowed to co-rotate with the first ratchet 174, thereby preventing the above-described sliding of the teeth 186, 202 of the first and second ratchets 174, 178, effectively disabling the hammer mechanism 170. As described above, the ball bearings 220 between the second ratchet 178 and the washer 214 facilitate rotation of the second ratchet 178 relative to the washer 214. In the illustrated embodiment of the mode selector assembly 222, the actuator 230 is configured as a ring surrounding the second transmission housing portion 252. As such, to disable the hammer mechanism 170 of the power tool 10, a user of the power tool 10 need only incrementally rotate the actuator 230 from the position shown in FIG. 5 to the position shown in FIG. 4. Likewise, to enable the hammer mechanism 170 of the power tool 10, the user of the power tool 10 need only incrementally rotate the actuator 230 from the position shown in FIG. 4 to the position shown in FIG. 5. With reference to FIGS. 2, 3, and 6-8, the mode selector assembly 222 also includes a detent mechanism 262 (e.g., including a spring 266 and ball 270) operable to positively locate the actuator 230 in the respective positions shown in FIGS. 4 and 5.

In operation, the power tool 10 is user-configurable to disable or enable the hammer mechanism 170 of the power tool 10. As discussed above, a user may disable the hammer mechanism 170 by rotating the actuator 230 relative to the second transmission housing portion 252 to the position shown in FIG. 4, thereby engaging the ramps 258 and the respective spring perches 238 to cause the ratchet-engaging member 226 to move away from the second ratchet 178 along the central axis 38 against the bias of the springs 242. In this position, the second ratchet 178 is unconstrained and may co-rotate with the first ratchet 174, the carrier 110, and the chuck assembly 30 as a unit when the rotational output 22 of the power tool 10 is pressed against a workpiece (against the bias of the spring 162). The ball bearings 220 between the second ratchet 178 and the washer 214 facilitate rotation of the second ratchet 178 relative to the washer 214. As such, the power tool 10 is operable only as a drill, such that a tool bit secured between the jaws 42 of the chuck assembly 30 is rotatable about the central axis 38 (FIG. 6). It should be understood that the position of the chuck assembly 30 relative to the carrier 110 in FIG. 6 corresponds to the position of the chuck assembly 30 when the rotational output 22 of the power tool 10 is pushed against a workpiece via a tool bit.

A user enables the hammer mechanism 170 by rotating the actuator 230 relative to the second transmission housing portion 252 to the position shown in FIG. 5, thereby disengaging the ramps 258 and the respective spring perches 238 to allow the springs 242 to move the ratchet-engaging member 226 toward the second ratchet 178 to rotationally interlock or engage the respective teeth 234, 206 of the ratchet-engaging member 226 and the second ratchet 178. Because the ratchet-engaging member 226 is rotationally constrained due to the insertion of the spring perches 238 in the respective slots 254 of the second transmission housing portion 252, the second ratchet 178 is also prevented from co-rotating with the first ratchet 174, thereby causing the teeth 186 of the first ratchet 174 to incrementally slide over the teeth 202 of the second ratchet 178 when rotational output 22 is pressed against a workpiece against the bias of the spring 162.

This sliding movement of the first ratchet 174 relative to the second ratchet 178 causes the first ratchet 174 and the attached chuck assembly 30 to incrementally displace or translate along the central axis 38 in a reciprocating manner. In other words, in addition to the first ratchet 174, the carrier 110, and the chuck assembly 30 co-rotating as a unit, the first ratchet 174 and the chuck assembly 30 reciprocate along the central axis 38 as a unit. More particularly, the above-described sliding movement of the first ratchet 174 relative to the second ratchet 178 causes the chuck assembly 30 and the first ratchet 174 to reciprocate to a forward-most position (FIG. 8), while the user provides a restoring force to the chuck assembly 30 by pressing the power tool 10 against a workpiece to cause the chuck assembly 30 and the first ratchet 174 to reciprocate to a rearward-most position (FIG. 7), against the bias of the spring 162. As such, the power tool 10 is operable as a hammer-drill, such that a tool bit secured between the jaws 42 of the chuck assembly 30 is rotatable about the central axis 38 and translatable along the central axis 38. It should be understood that the position of the chuck assembly 30 relative to the carrier 110 in FIGS. 7 and 8 corresponds to the position of the chuck assembly 30 when the rotational output 22 of the power tool 10 is pushed against a workpiece via a tool bit.

Figure 9:
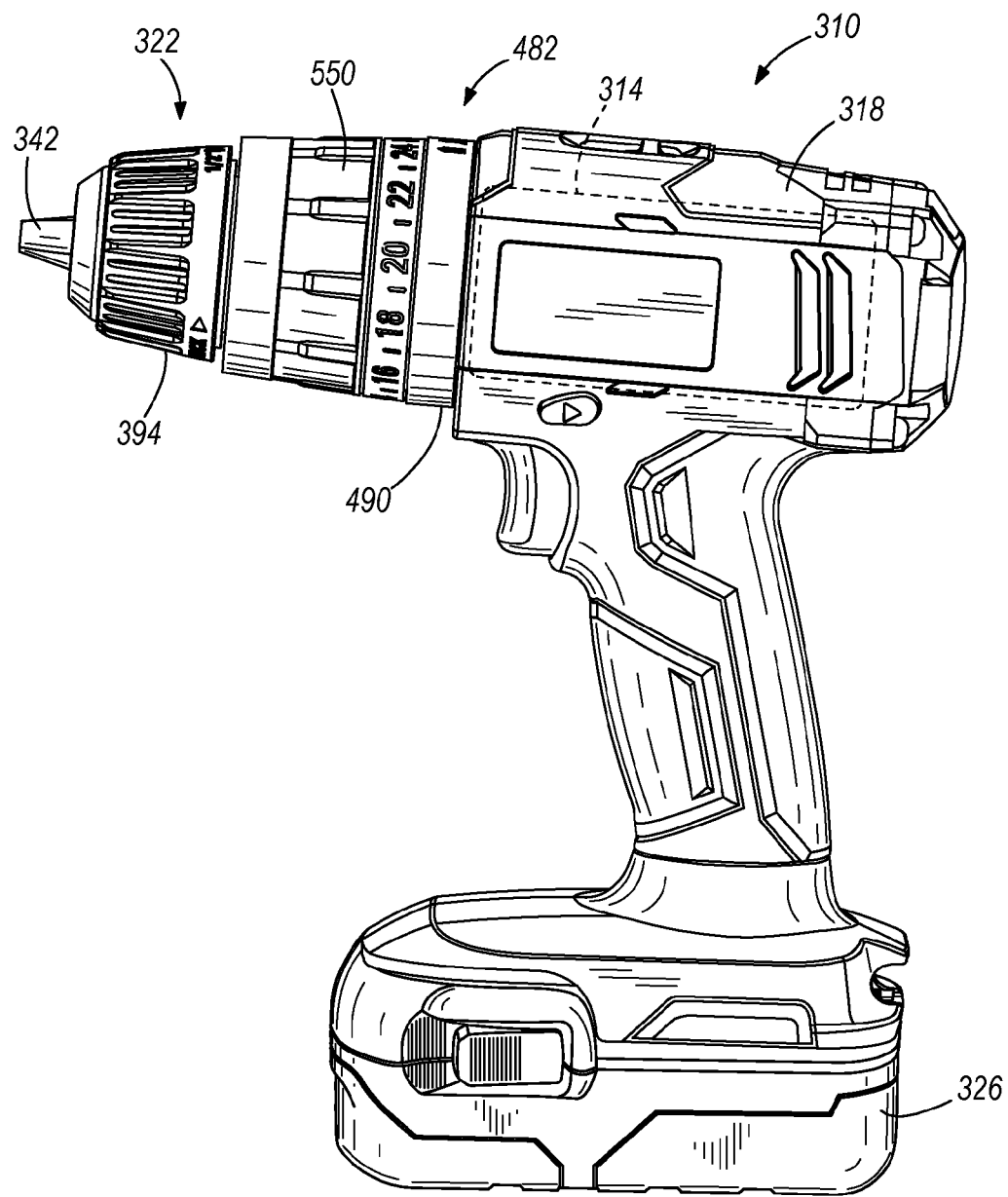
FIG. 9 a side view of a power tool incorporating a chuck assembly and a hammer mechanism according to another embodiment of the invention.

FIG. 9 illustrates a power tool 310, according to another embodiment of the invention, including an electric motor 314, a housing 318 in which the electric motor 14 is supported, and a rotational output 322 operable to perform work on a workpiece. In the illustrated embodiment of the power tool 310, the power tool 310 is configured as a drill operable to receive a tool bit to perform work on a workpiece (e.g., a drill bit, a screw bit, etc.). Alternatively, the power tool 310 may be configured as any of a number of different tools having a rotational output (e.g., a grinder, router, etc.).

With continued reference to FIG. 9, the housing 318 supports the electric motor 314 and a battery 326 electrically connected to the motor 314. The battery 326 may be configured having any of a number of different voltages (e.g., 4 volts, 12 volts, 18 volts, etc.) depending upon the range of applications of the power tool 310 and may utilize any of a number of different chemistries (e.g., lithium-ion, nickel-cadmium, etc.). The battery 326 is also removable from the housing 318 for charging by a separate battery charger. However, in another embodiment of the power tool 310, the battery 326 may be enclosed within the housing 318 and non-removable from the power tool 310. In such an embodiment, the power tool 310 may also incorporate a battery charging circuit to charge the internal battery. Alternatively, the power tool 310 may include a power cord (not shown) to electrically connect the motor 314 to a remote power source (e.g., household line alternating current available from a power outlet) rather than incorporating an onboard direct current power source (i.e., the battery 326). The battery 326 may also be interchangeable with a variety of other power tools to supply power to the power tools (e.g., saws, flashlights, etc.).

Figure 10:
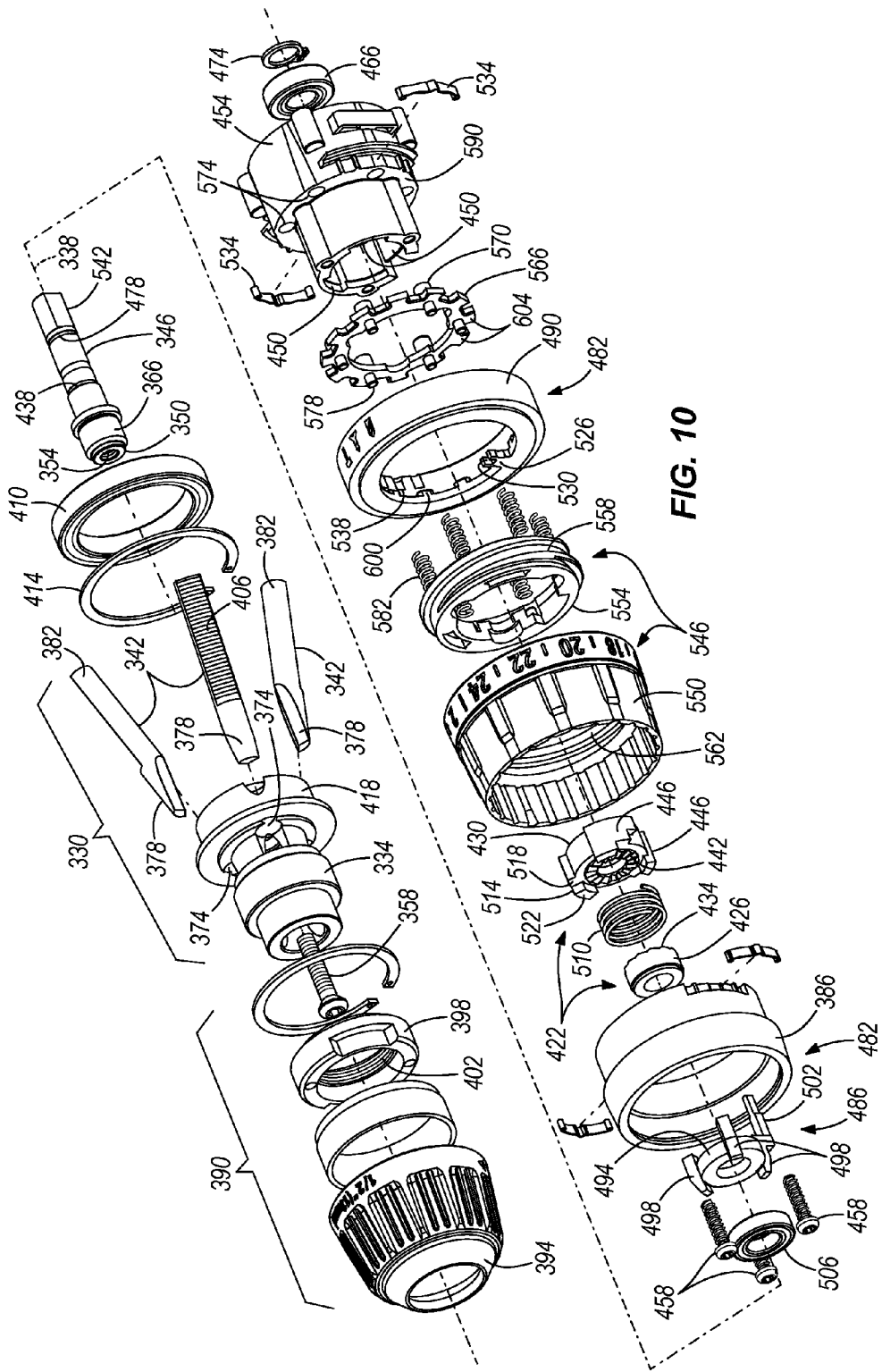
FIG. 10 is an exploded perspective view of a portion of the power tool of FIG. 9.
Figure 11:
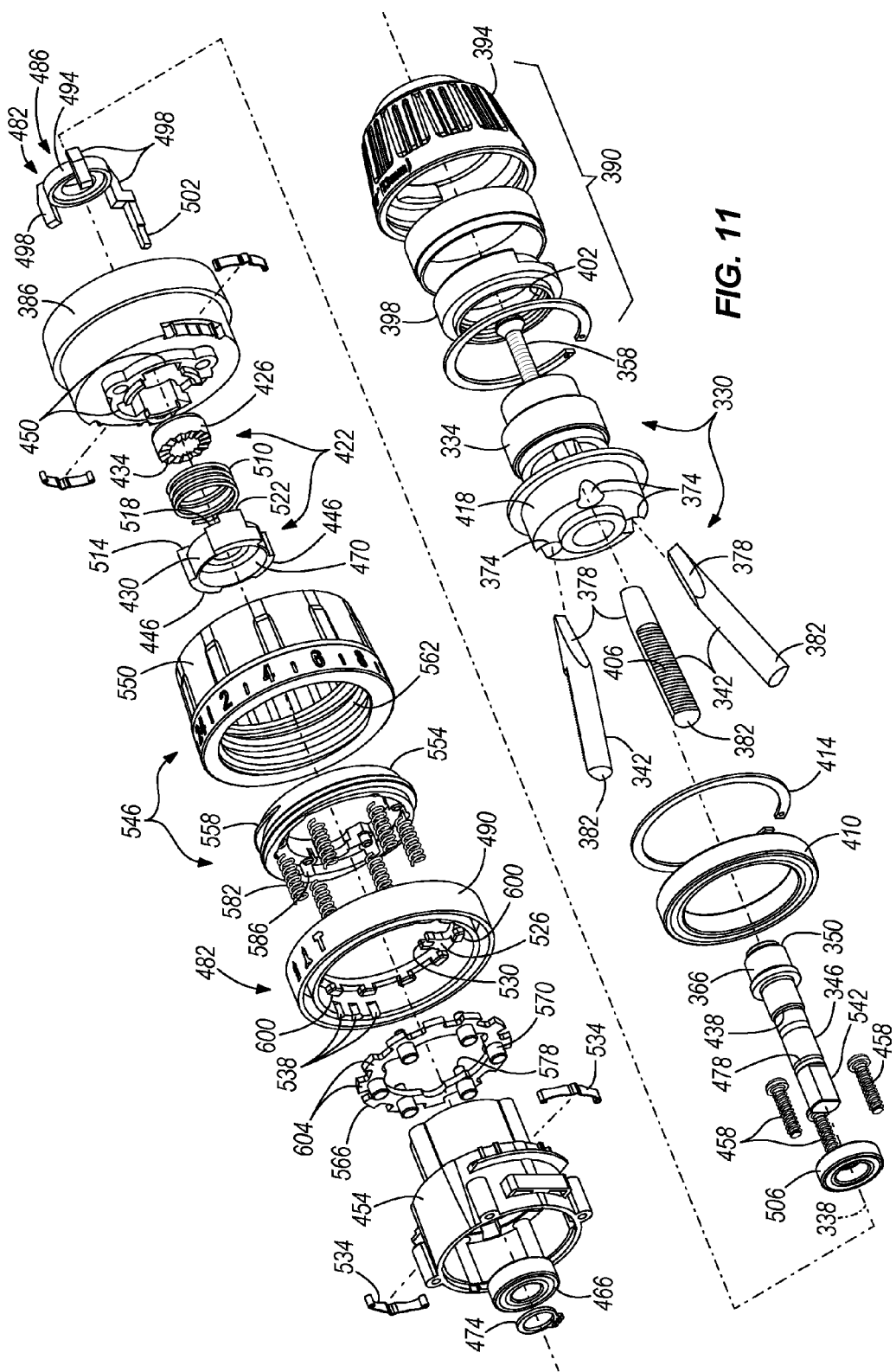
FIG. 11 is a reverse, exploded perspective view the portion of the power tool of FIG. 10.

With reference to FIGS. 10 and 11, the power tool 310 includes a chuck assembly 330 (i.e., the rotational output 322) having a chuck body 334 rotatable about a central axis 338 in response to torque received from the motor 314 and jaws 342 supported in the chuck body 334. In the illustrated embodiment of the power tool 310, a spindle 346 is utilized to transfer torque from the motor 314 to the chuck assembly 330. A first end 350 of the spindle 346 includes a threaded bore 354 within which a threaded fastener 358 (e.g. a screw) is received (see also FIGS. 14-16). The chuck body 334 includes an aperture 362 (FIG. 14) aligned with the central axis 338 through which the fastener 358 extends to axially secure the chuck body 334 to the spindle 346. An interference fit between a cylindrical outer periphery 366 of the spindle 346 and an internal bore 370 in the chuck body 334 is sufficient to prevent relative rotation between the spindle 346 and the chuck body 334.

Figure 14:
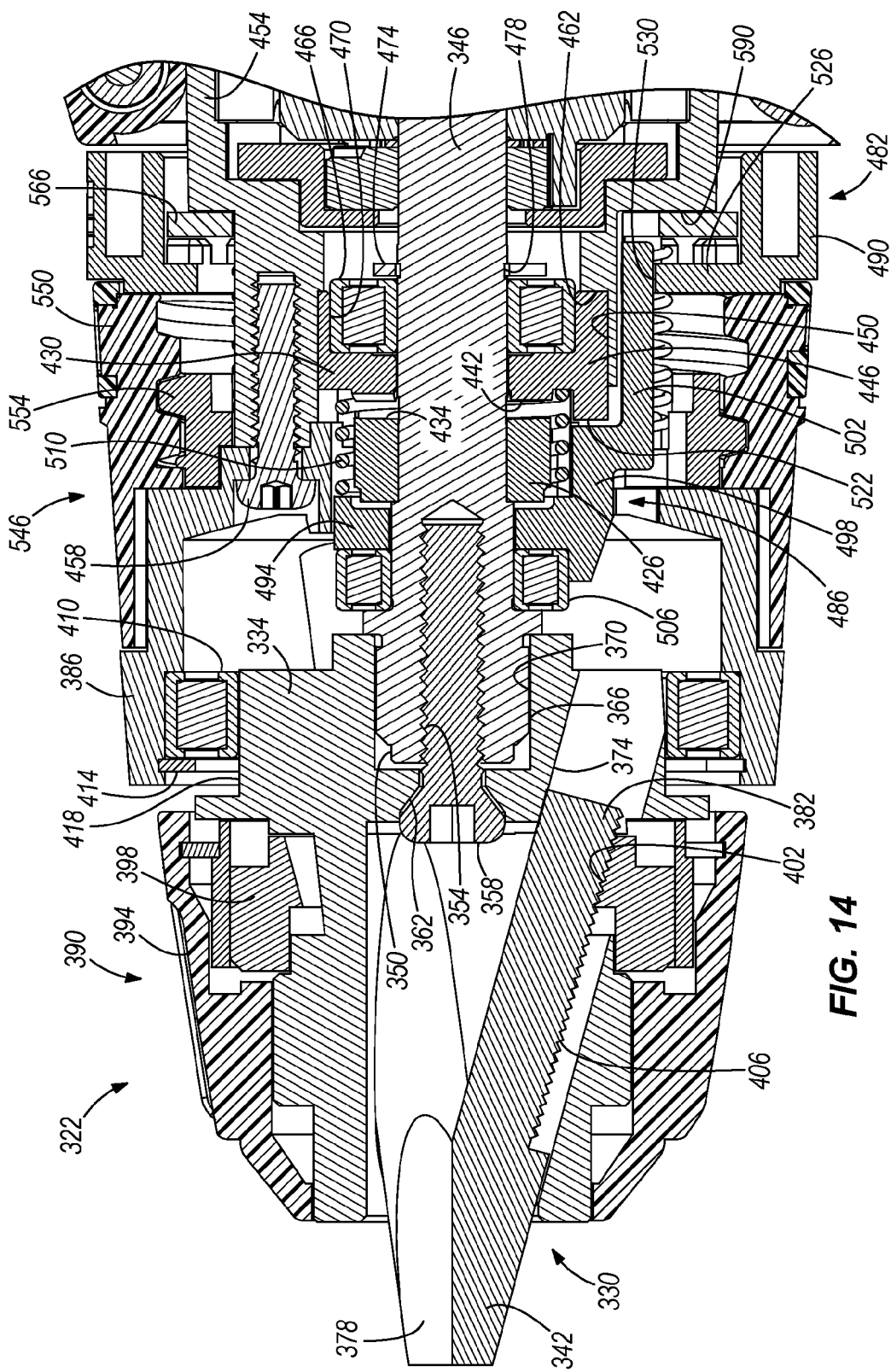
FIG. 14 is a cross-sectional view of the power tool of FIG. 9 through line 14-14 in FIG. 12, illustrating the hammer mechanism disabled.
Figure 15:
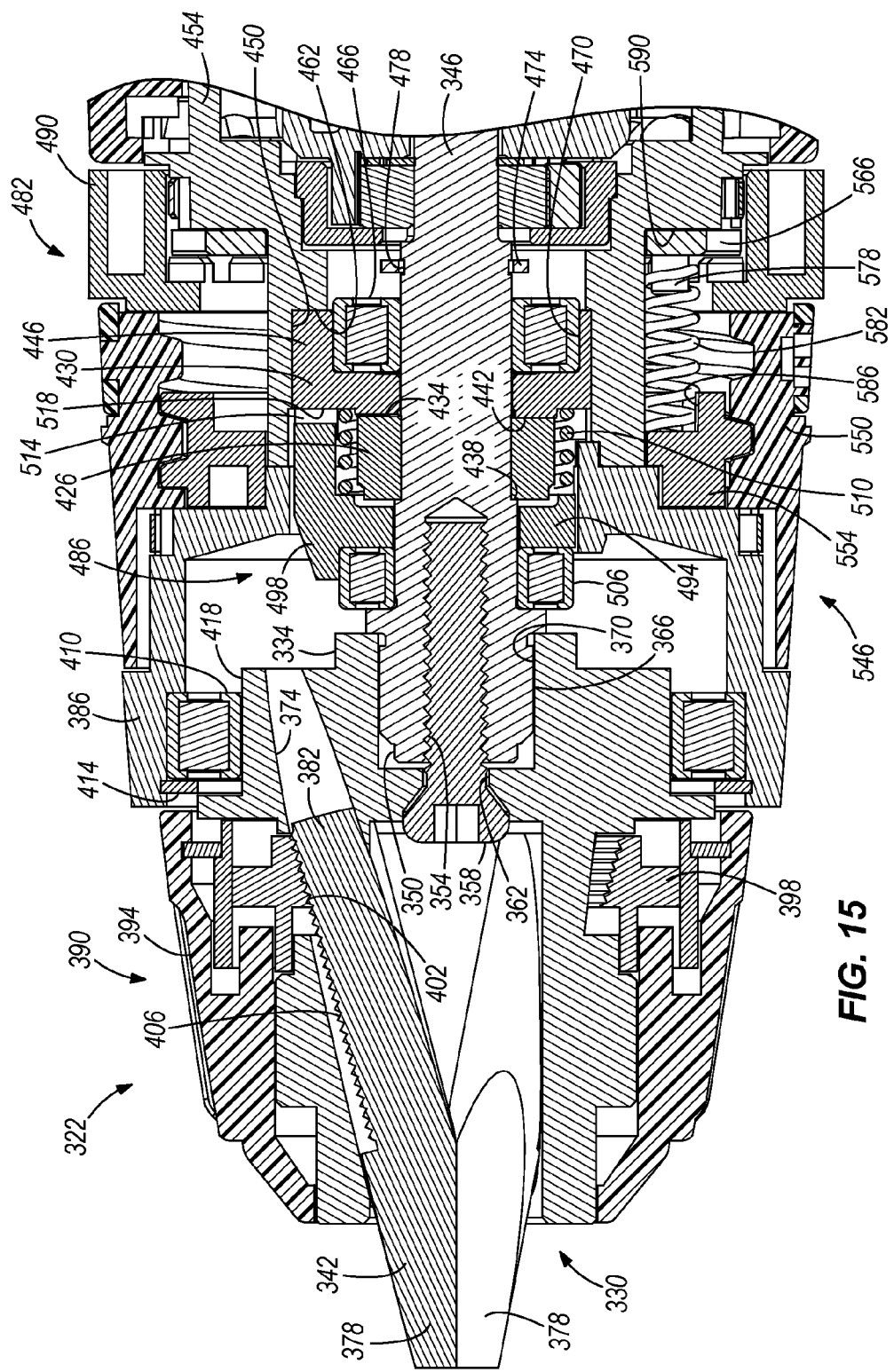
FIG. 15 is a cross-sectional view of the power tool of FIG. 9 through line 15-15 in FIG. 13, illustrating the hammer mechanism enabled and the chuck assembly in a retracted or rearward position.
Figure 16:
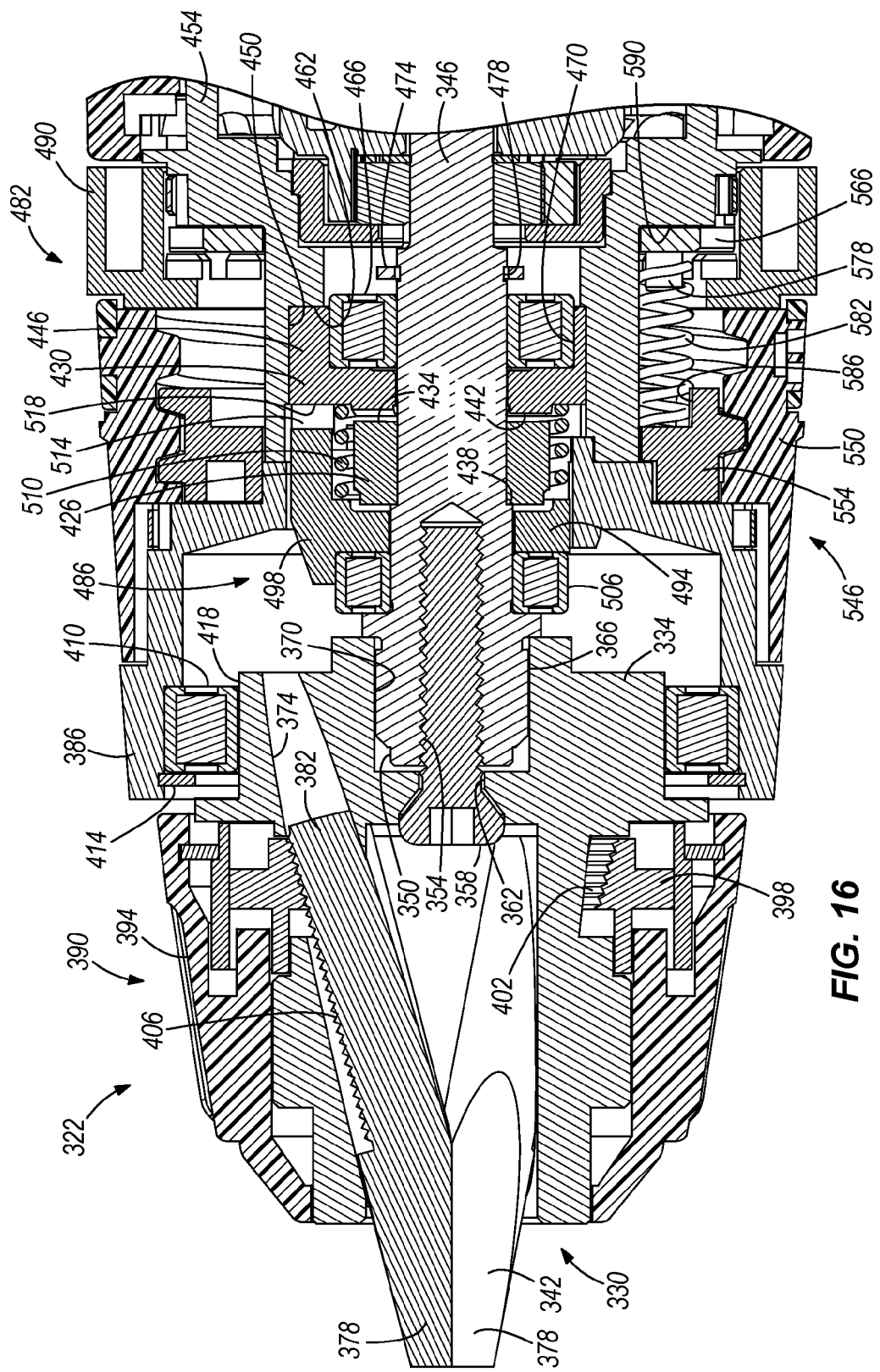
FIG. 16 is a cross-sectional view of the power tool of FIG. 9, illustrating the hammer mechanism enabled and the chuck assembly in an extended or forward position.

With reference to FIGS. 10 and 11, the chuck body 334 includes bores 374 in which the respective jaws 342 are received. Each of the bores 374 is oriented at an oblique angle relative to the central axis 338 of the chuck body 334, such that front portions or tips 378 of the respective jaws 342 move toward each other or converge on the central axis 338 when the jaws 342 extend from the chuck body 334 to secure a tool bit. Likewise, the front portions or tips 378 of the jaws 342 move away from each other or diverge from the central axis 338 when the jaws 342 retract into the chuck body 334 to release the tool bit. With reference to FIGS. 14-16, rear portions 382 of the respective jaws 342 are positioned outside the chuck body 334 when the jaws 342 are fully extended and fully retracted relative to the chuck body 334. The rear portions 382 of the jaws 342, in turn, are positioned inside the open interior of a first transmission housing portion 386 when the respective jaws 342 are fully retracted relative to the chuck body 334. This arrangement of the jaws 342 with respect to the chuck body 334 allows the overall length of the chuck body 334 to be decreased compared to a chuck body in a conventional drill, which is typically long enough to contain the entire length of each of the jaws when completely retracted into the chuck body. As such, the overall length of the power tool 310 is decreased, allowing for increased maneuverability of the power tool 310. Additional benefits and features of shortened chuck assemblies, similar to the chuck assembly 330 disclosed in the present application, are disclosed in published U.S. Patent Publication Nos. 2009/0003949 and 2009/0003950 mentioned above.

With reference to FIGS. 10 and 11, the chuck assembly 330 includes a sleeve assembly 390 positioned over a front portion of the chuck body 334 to facilitate the extension and refraction of the jaws 342 relative to the chuck body 334. Specifically, the sleeve assembly 390 includes an outer sleeve 394 and a ring 398, positioned within and secured to the outer sleeve 394, having threads 402 formed on an inner peripheral surface of the ring 398. Each of the jaws 342 includes corresponding threads 406 on a radially outward-facing surface of the jaws 342 which engage the threads 402 on the ring 398. Further, the sleeve assembly 390 is rotatably coupled to the chuck body 334 and axially secured to the chuck body 334, such that the sleeve assembly 390 may be rotated relative to the chuck body 334 but not moved axially (i.e., along the central axis 338) relative to the chuck body 334. As a result, rotation of the sleeve assembly 390 relative to the chuck body 334 in a first direction about the central axis 338 causes the front portions or tips 378 of the jaws 342 to extend from the chuck body 334, while rotation of the sleeve assembly 390 relative to the chuck body 334 in a second or opposite direction about the central axis 338 causes the front portions or tips 378 of the jaws 342 to retract into the chuck body 334. Alternatively, the threads 402 on the inner peripheral surface of the ring 398 may be integrally formed with the outer sleeve 394 to actuate the jaws 342.

With continued reference to FIGS. 10 and 11, the power tool 310 also includes a bearing 410 (e.g., a roller bearing) supporting the chuck body 334 for rotation relative to the housing 318. In the illustrated embodiment of the power tool 310, the bearing 410 is axially secured in the first transmission housing portion 386 by a retaining ring 414 (see also FIGS. 14-16). The chuck body 334 includes an outer cylindrical portion 418 that is maintained coaxial with the spindle 346 by the inner race of the bearing 410. However, the outer cylindrical portion 418 is not axially constrained to the inner race of the bearing 410. The chuck body 334 and the spindle 346, therefore, are axially movable relative to the first transmission housing portion 386 and the housing 318 as a unit.

With reference to FIGS. 10 and 11, the power tool 310 also includes a hammer mechanism 422 operable to impart movement to the chuck assembly 330, in a direction parallel to the central axis 318, during rotation of the chuck assembly 330 about the central axis 338. The hammer mechanism 422 includes a first ratchet 426 coupled for co-rotation with the spindle 346 about the central axis 338 and a second ratchet 430 in facing relationship with the first ratchet 426. The first ratchet 426 includes axially-extending teeth 434, and is positioned adjacent a radially-outwardly-extending lip 438 on the spindle 346. The first ratchet 426 is also rotatably secured or fixed to the spindle 346 (e.g., using an interference fit, by welding, brazing, integrally-forming, etc.) such that relative rotation between the spindle 346 and the first ratchet 426 is inhibited.

With continued reference to FIGS. 10 and 11, the second ratchet 430 includes axially-extending teeth 442 arranged about the central axis 338 in a corresponding manner to the teeth 434 of the first ratchet 426. The second ratchet 430 also includes radially outwardly-extending projections 446 that are received within correspondingly-shaped recesses or slots 450 in a second transmission housing portion 454 (FIG. 10) such that the second ratchet 430 is rotationally fixed relative to the second transmission housing portion 454. As shown in FIGS. 10, 11, and 14-16, the first and second transmission housing portions 386, 454 are coupled using fasteners 458 (e.g., screws).

With reference to FIGS. 14-16, the rear of the second ratchet 430 is also positioned adjacent a radially inwardly-extending lip 462 on the second transmission housing portion 454 to limit the extent to which the projections 446 are received within the respective slots 450. The power tool 310 also includes a bearing 466 (e.g., a roller bearing) received within a pocket 470 formed in the rear of the second ratchet 430 (FIG. 11) and a retaining ring 474 secured to the spindle 346 within a recess 478 formed in the spindle 346. The bearing 466 maintains the spindle 346 coaxial with the second transmission housing portion 454 and the output shaft of the motor 314, yet allows the spindle 346 to slide relative to the inner race of the bearing 466. The retaining ring 474 limits the extent to which the spindle 346 (and therefore the chuck assembly 330) may axially slide relative to the bearing 466 and the second transmission housing portion 454 away from the motor 314 (FIG. 14).

With reference to FIGS. 10 and 11, the power tool 310 further includes a mode selector assembly 482 having a stop member 486 movable between a first position, in which the hammer mechanism 422 is enabled (FIG. 13), and a second position, in which the hammer mechanism 422 is disabled (FIG. 12), and an actuator 490 for moving the stop member 486 between the first position and the second position. With reference to FIGS. 10 and 11, the stop member 486 includes a central ring 494 and tabs 498 arrayed and equi-angularly spaced about the outer periphery of the ring 494. The tabs 498 are also oriented in a direction that is substantially parallel with the central axis 338. The stop member 486 also includes a finger 502, the purpose of which is discussed below, projecting from one of the tabs 498 in a direction that is substantially parallel with the tabs 498 and the central axis 338. Alternatively, the finger 502 may extend directly from the central ring 494 and not coincide with any of the tabs 498.

With reference to FIGS. 14-16, the power tool 310 also includes a bearing 506 (e.g., a roller bearing) having an inner race secured to the spindle 346 and an outer race engaged by each of the tabs 498. Accordingly, the bearing 506 carries the stop member 486 on the spindle 346 and maintains the stop member 486 coaxial with the spindle 346, while permitting the spindle 346 to rotate relative to the stop member 486. As is discussed below, the stop member 486 and the actuator 490 are co-rotatable about the central axis 338 between the first and second positions. Therefore, the stop member 486 is held stationary relative to the housing 318 with the actuator 490 while the power tool 310 is in use.

With reference to FIGS. 10, 11, and 14-16, the power tool 310 further includes a resilient member 510 (e.g., a spring) positioned between the second ratchet 430 and the stop member 486 to at least partially impart reciprocating motion of the chuck assembly 330 relative to the first and second transmission housing portions 386, 454 and the housing 318 during operation of the power tool 310. In the illustrated embodiment of the power tool 310, the spring 510 is configured as a compression spring 510 having its opposite ends contacting the second ratchet 430 and the stop member 486, respectively, such that the bias of the spring 510 pushes the spindle 346 and the chuck assembly 330 away from the second ratchet 430. The engagement between the retaining ring 474 on the spindle 346 and the inner race of the bearing 466 limits the extent to which the spindle 346 and the chuck assembly 330 are pushed away from the second ratchet 430 (i.e., to the left from the point of view of FIG. 14).

Figure 12:
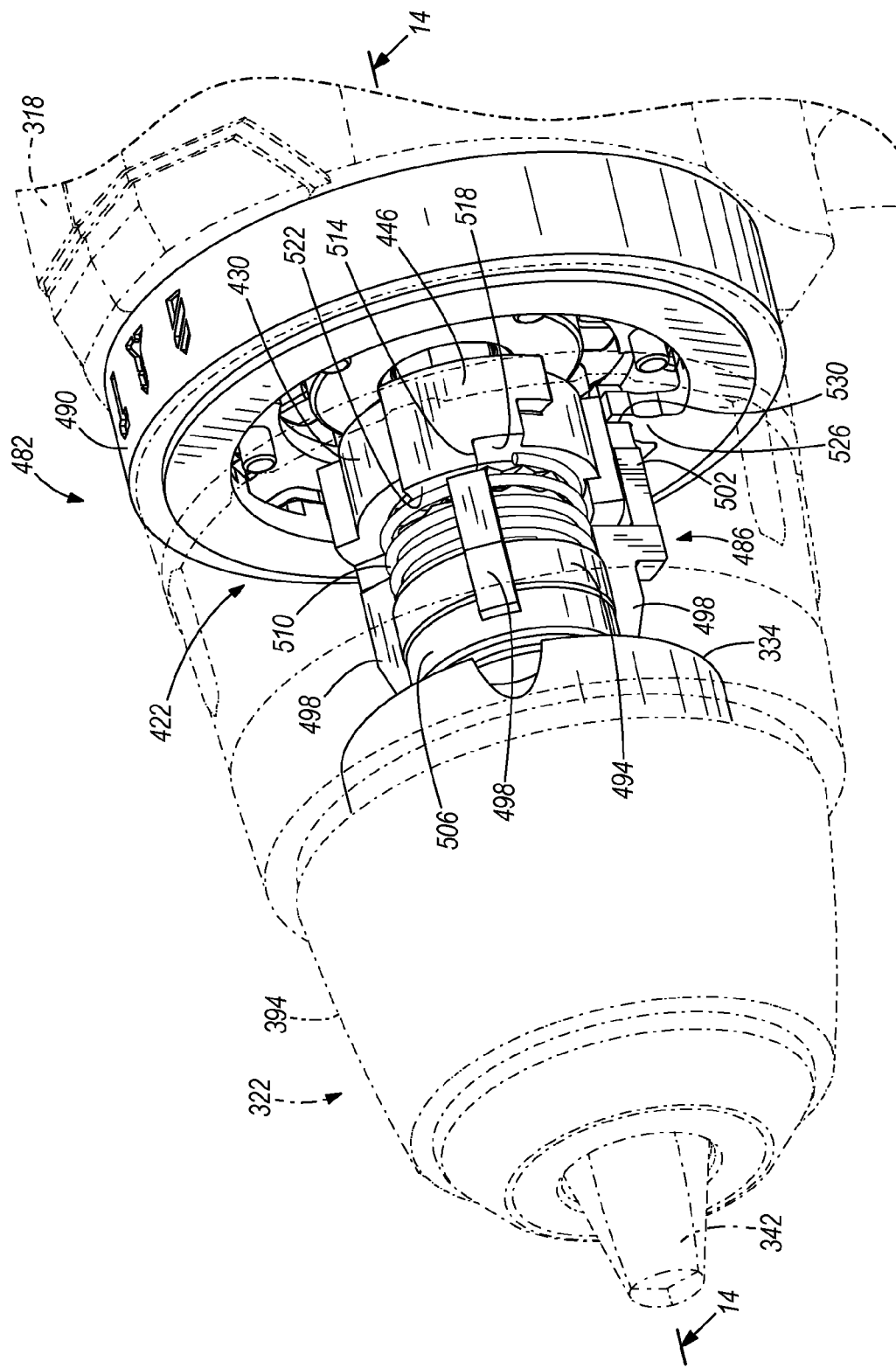
FIG. 12 is a perspective view of a hammer mechanism and a mode selector assembly of the power tool of FIG. 9, illustrating the hammer mechanism disabled.
Figure 13:
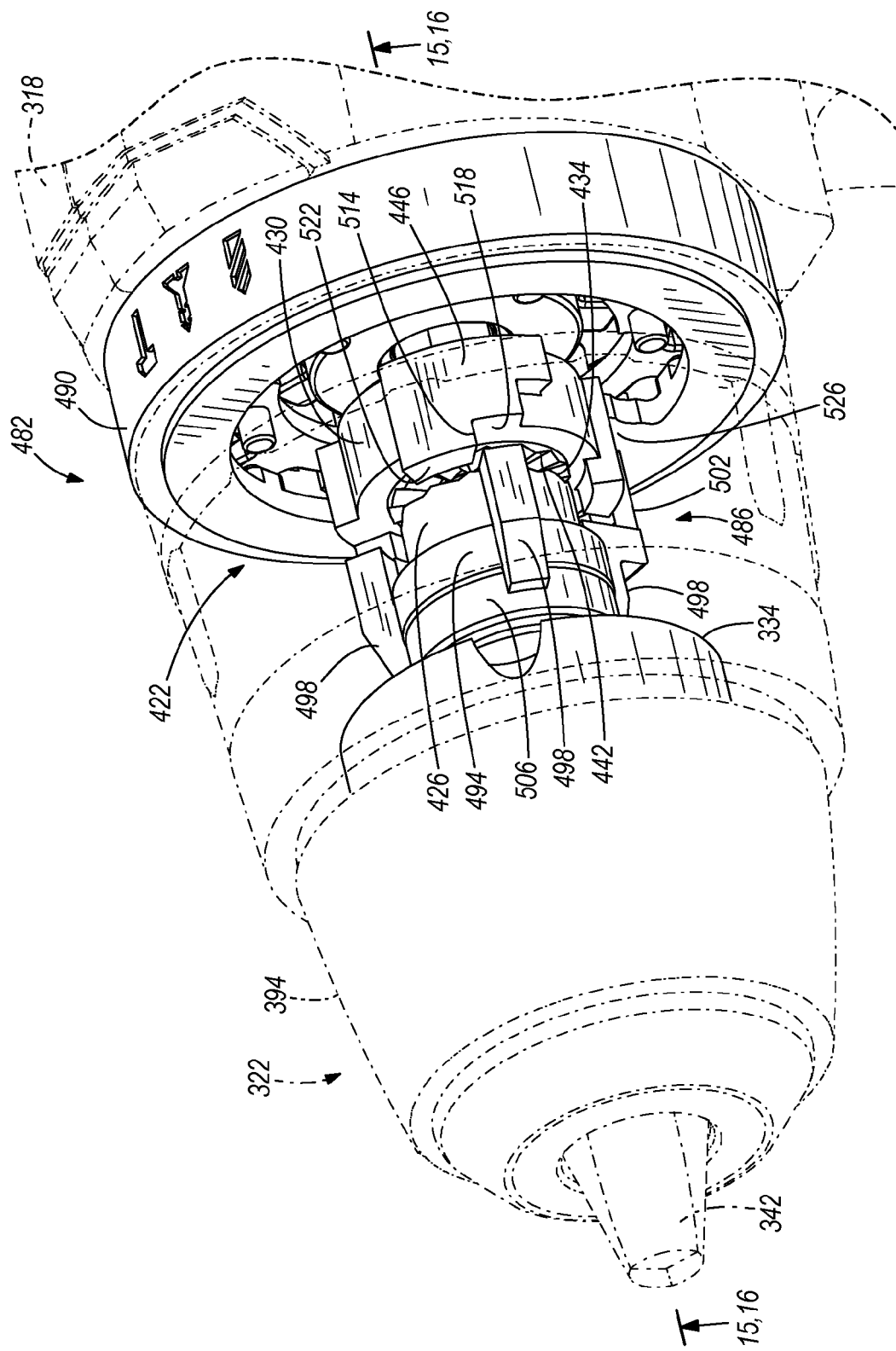
FIG. 13 is a perspective view of the hammer mechanism and mode selector assembly of the power tool of FIG. 9, illustrating the hammer mechanism enabled.

With reference to FIGS. 10, 12, and 13, each of the projections 446 on the second ratchet 430 includes a stepped surface 514 having a first portion 518 or step that is oriented substantially normal to the central axis 338, and a second portion or step 522 that is oriented substantially normal to the central axis 338. The first and second steps 518, 522 are adjacent and axially spaced from each other in a direction parallel to the central axis 338 such that the second step 522 is disposed nearer the chuck assembly 330 than the first step 518.

With reference to FIGS. 10 and 11, the actuator 490 includes a radially inwardly-extending tab 526 and a slot 530 disposed in the tab 526 within which the finger 502 on the stop member 486 is received. As such, the actuator 490 and the stop member 486 are co-rotatable about the central axis 338 between the first and second positions described above. When the actuator 490 is rotated to the first position in which the hammer mechanism 422 is enabled (FIG. 13), the tabs 498 on the stop member 486 are axially aligned with the respective first steps 518 on the second ratchet 430. Accordingly, the chuck assembly 330 may retract into the first transmission housing portion 386, against the bias of the spring 510, when a tool bit held by the chuck assembly 330 is depressed against a workpiece, thereby causing the first and second ratchets 426, 430 to engage (FIG. 15). When the motor 314 is activated to rotate the spindle 346, the teeth 434, 442 of the respective ratchets 426, 430 ride over each other, imparting a reciprocating motion to the spindle 346 and the attached chuck assembly 330 with respect to the housing 318.

When the actuator 490 is rotated to the second position in which the hammer mechanism 422 is disabled (FIG. 12), the tabs 498 on the stop member 486 are axially aligned with the respective second steps 522 on the second ratchet 430. Accordingly, the spindle 346 and the chuck assembly 330 are prevented from retracting into the first transmission housing portion 386 far enough to cause the first and second ratchets 426, 430 to engage when the tool bit and the chuck assembly 330 are depressed against a workpiece (FIG. 14). As shown in FIG. 14, the spacing between the tabs 498 and the respective second steps 522 is less than the spacing between the ratchets 426, 430. Therefore, spacing is maintained between the first and second ratchets 426, 430 at all times, thereby preventing reciprocating motion from being imparted to the spindle 346 and the chuck assembly 330 when the motor 314 is activated to rotate the spindle 346.

In the illustrated embodiment of the power tool 310, the actuator 490 is configured as a ring surrounding the second transmission housing portion 454. As such, to disable the hammer mechanism 422, a user of the power tool 310 need only incrementally rotate the actuator 490 from the position shown in FIG. 13 to the position shown in FIG. 12. Likewise, to enable the hammer mechanism 422, the user of the power tool 310 need only incrementally rotate the actuator 490 from the position shown in FIG. 12 to the position shown in FIG. 13. With reference to FIGS. 10 and 11, the mode selector assembly 482 also includes a detent mechanism 534 (e.g., spring clips) operable to positively locate the actuator 490 in the respective positions shown in FIGS. 12 and 13. Particularly, the actuator 490 includes corresponding recesses 538 (FIG. 11) in which the spring clips 534 are received to locate the actuator 490 in the respective positions shown in FIGS. 12 and 13. A third recess 538 is shown corresponding to a third position of the actuator 490 in which a clutch mechanism (not shown) in the power tool 310 is locked out (e.g., when the power tool 310 is in a drill mode).

Although not shown in FIGS. 10 and 11, the power tool may include a transmission operably coupling a second end 542 of the spindle 346 and the motor 314 to reduce the rotational speed of the spindle 346 relative to the output shaft of the motor 314, and to increase the amount of torque transferred to the spindle 346 from the output shaft of the motor 314. Such a transmission (e.g., including one or more offset gears or planetary geartrain arrangements) may be similar to the power tool transmissions disclosed in published U.S. Patent Publication Nos. 2009/0003949 and 2009/0003950 mentioned above.

With reference to FIGS. 9-11, the power tool 310 also includes a torque adjustment mechanism 546 operable to allow a user of the power tool 310 to adjust the amount of torque that the chuck assembly 330 is capable of applying to a workpiece. In the illustrated embodiment, the torque adjustment mechanism 546 includes a ring or sleeve 550 surrounding a rear portion of the chuck assembly 330, which is rotatable with respect to the power tool housing 318 to adjust the amount of torque that the chuck assembly 330 is capable of applying to a workpiece. With reference to FIGS. 10 and 11, the torque adjustment mechanism 546 also includes an adjusting ring 554 having a threaded outer periphery 558 that is engageable with a threaded inner periphery 562 of the sleeve 550, such that relative rotation between the sleeve 550 and the ring 554 imparts axial movement to the ring 554.

The torque adjustment mechanism 546 further includes a washer 566 disposed between the ring 554 and the second transmission housing portion 454 of the power tool 310. The washer 566 includes first pins 570 that are received within respective apertures 574 in the transmission housing portion 454. Accordingly, the washer 566 is permitted to move axially with respect to the transmission housing portion 454, yet prevented from rotating relative to the transmission housing portion 454. The washer 466 also includes second pins 578 extending toward the ring 554. Corresponding compression springs 582 are inserted over the pins 578 and received within respective spring perches 586 (FIG. 11) formed in the ring 554. As such, the ring 554 preloads the springs 582 against the washer 566 to bias the washer 566 toward an annular face 590 (FIG. 10) of the transmission housing portion 454.

Although not shown in FIG. 10 or 11, the pins 570 engage corresponding cam members (e.g., ball bearings) which, in turn, engage an annular, axial-facing cam track on an outer ring gear of the planetary transmission of the power tool 310. The cam track includes spaced ridges against which the cam members are jammed to maintain the outer ring gear fixed with respect to the transmission housing portion 454. When the outer ring gear is fixed with respect to the transmission housing portion 454, torque from the motor 314 is transferred to the spindle 346. However, when a fastener exerts a reaction torque on the spindle 346 above a predetermined threshold (depending upon the rotational position of the sleeve 550), the spindle 346 seizes, allowing the cam members to ride over the ridges on the outer ring gear as the torque from the motor 314 is transferred to the outer ring gear to rotate the ring gear with respect to the transmission housing portion 454. Consequently, the combination of the outer ring gear, the cam members, and the springs 582 functions as a clutch mechanism operable to selectively divert torque from being transferred to the spindle 346. The preload on the springs 582 may be adjusted by rotating the sleeve 550 which, in turn, incrementally moves the adjusting ring 554 in accordance with the numbers or values imprinted on the sleeve 550. The greater the preload on the springs 582, the more torque can be transferred to the spindle 346 before any slippage occurs between the outer ring gear and the transmission housing portion 454.

When the cam members ride over the ridges on the outer ring gear, the washer 566 is also displaced by the same amount from the annular face 590 of the transmission housing portion 454. Therefore, if the washer 566 is prevented from moving away from the annular face 590, the cam members jam against the ridges of the outer ring gear, rather than being allowed to ride over the ridges, thereby preventing the outer ring gear from rotating relative to the transmission housing portion 454. Consequently, the torque from the motor 314 cannot be diverted from the spindle 346.

In the illustrated embodiment of the power tool 310, the actuator 490 is also employed to selectively disable or enable the clutch mechanism of the power tool 310 (i.e., including the outer ring gear, the cam members, and the springs 582 discussed above). With reference to FIG. 11, the actuator 490 includes internal projections 600 spaced about the inner periphery of the actuator 490, and the washer 566 includes radial tabs 604 spaced about the outer periphery of the washer 566 in a corresponding manner as the projections 600 on the actuator 490. Therefore, the actuator 490 may be rotated between a first position, in which all of the projections 600 are aligned with the respective tabs 604, and a second position, in which none of the projections 600 are aligned with the respective tabs 604. When the actuator 490 is rotated to the first position, the projections 600 are engageable with the tabs 604 to prevent the washer 566 from moving away or unseating from the annular face 590 far enough to permit the cam members to ride over the ridges on the outer ring gear as discussed above. As such, the cam members jam against the ridges and disable or prevent slippage of the clutch mechanism (i.e., the outer ring gear is prevented from rotating with respect to the transmission housing portion 454).

However, when the actuator 490 is rotated to the second position, the projections 600 are misaligned with the tabs 604, such that the washer 566 is not prevented from moving away or unseating from the annular face 590 of the transmission housing portion 454. As a result, the clutch mechanism is enabled and is not prevented from slipping.

In operation, the power tool 310 is user-configurable to disable or enable the hammer mechanism 422. As discussed above, a user may disable the hammer mechanism 442 by rotating the actuator 490 relative to the second transmission housing portion 454 to the position shown in FIG. 12, thereby aligning the tabs 498 on the stop member 486 with the respective second steps 522 on the second ratchet 430. In this position, the first and second ratchets 426, 430 are prevented from engaging each other when a tool bit held by the chuck assembly 330 is pressed against a workpiece. As such, the power tool 330 is operable only as a drill, such that the tool bit secured between the jaws 342 of the chuck assembly 330 is rotatable about the central axis 338 (FIG. 14). In addition, when the actuator 490 is in the position shown in FIG. 12, the projections 600 are misaligned from the tabs 604 to enable the clutch mechanism.

A user enables the hammer mechanism 422 by rotating the actuator 490 relative to the second transmission housing portion 454 to the position shown in FIG. 13, thereby aligning the tabs 498 on the stop member 486 with the respective first steps 518 on the second ratchet 430. In this position, the first ratchet 426 is allowed to move toward and engage the second ratchet 430 when the tool bit and the chuck assembly 330 are pressed against a workpiece, thereby causing the teeth 434 of the first ratchet 426 to incrementally slide over the teeth 442 of the second ratchet 430 when the motor 314 is activated. Sliding movement of the first ratchet 426 relative to the second ratchet 430 causes the first ratchet 426, the spindle 346, and the attached chuck assembly 330 to incrementally displace or translate along the central axis 338 in a reciprocating manner as the tool bit in the chuck assembly 330 is held against the workpiece.

In other words, in addition to the first ratchet 426, the spindle 346, and the chuck assembly 330 co-rotating as a unit, the first ratchet 426, the spindle 346, and the chuck assembly 330 reciprocate along the central axis 338 as a unit. More particularly, the above-described sliding movement of the first ratchet 426 relative to the second ratchet 430 causes the chuck assembly 330 and the first ratchet 426 to reciprocate to a forward-most position, while the user provides a restoring force to the chuck assembly 330 by pressing the power tool 310 against the workpiece to cause the chuck assembly 330 and the first ratchet 426 to reciprocate to a rearward-most position, against the bias of the spring 510. As such, the power tool 310 is operable as a hammer-drill, such that a tool bit secured between the jaws 342 of the chuck assembly 330 is rotatable about the central axis 338 and translatable along the central axis 338. It should be understood that the position of the chuck assembly 330 relative to the first transmission housing portion 386 in FIGS. 15 and 16 corresponds to the position of the chuck assembly 330 when the tool bit and chuck assembly 330 are pressed against a workpiece. In addition, when the actuator 490 is in the position shown in FIG. 13, the projections 600 are aligned with the tabs 604 to disable the clutch mechanism. As such, the clutch mechanism and the hammer mechanism 422 cannot be enabled at the same time.

Although particular constructions embodying independent aspects of the present invention have been shown and described, other alternative constructions will become apparent to those skilled in the art and are intended scope of the independent aspects of the invention.

Various features of the invention are set forth in the following claims.

What is claimed is:

1. A power tool comprising:
    a housing;
    a motor supported in the housing;
    a chuck assembly including
        a chuck body rotatable about a central axis in response to torque received from the motor, and
        a plurality of jaws supported in the chuck body, wherein each of the jaws includes a front portion operable to grasp a tool element and a rear portion positioned outside the chuck body;
    a hammer mechanism operable to impart movement to the chuck assembly, in a direction parallel to the central axis, during rotation of the chuck assembly about the central axis;
    a carrier rotatable about the central axis in response to torque received from the motor, the carrier supporting the chuck assembly for rotation about the central axis, and
    a bearing supporting the carrier for rotation relative to the housing.

2. The power tool of claim 1, further comprising a mode selector assembly coupled to the hammer mechanism, wherein the mode selector assembly is movable between a first position, in which the hammer mechanism is enabled, and a second position, in which the hammer mechanism is disabled.

3. The power tool of claim 1, wherein the carrier includes one of a projection and an aperture, in which the chuck body includes the other of the projection and the aperture, and in which the projection is slidably receivable in the aperture in response to reciprocating motion between the chuck assembly and the carrier during operation of the hammer mechanism.

4. The power tool of claim 1, further comprising a resilient member positioned between the chuck body and the carrier to at least partially impart the reciprocating motion of the chuck assembly relative to the carrier.

5. The power tool of claim 1, wherein the carrier includes a plurality of apertures through which the rear portions of the respective jaws extend.

6. The power tool of claim 1, wherein the chuck body includes a plurality of bores in which the respective jaws are received, and wherein each of the bores is oriented at an oblique angle relative to the central axis of the chuck body.

7. The power tool of claim 1, wherein the hammer mechanism includes
    a first ratchet coupled for co-rotation with the chuck body about the central axis, and
    a second ratchet in facing relationship with the first ratchet, wherein the second ratchet is fixed relative to the housing to enable the hammer mechanism, and wherein the second ratchet is co-rotatable with the first ratchet to disable the hammer mechanism.

8. The power tool of claim 7, further comprising a mode selector assembly including
    a ratchet-engaging member movable between a first position, in which the hammer mechanism is enabled, and a second position, in which the hammer mechanism is disabled, and
    an actuator operable to move the ratchet-engaging member between the first position and the second position.

9. The power tool of claim 8, further comprising a resilient member biasing the ratchet-engaging member toward one of the first position and the second position.

10. The power tool of claim 8, wherein the ratchet-engaging member is engaged with the second ratchet to fix the second ratchet relative to the housing when the ratchet-engaging member is in the first position.

11. The power tool of claim 8, wherein the actuator includes a ramp, and wherein the actuator is rotatable about the central axis to selectively engage the ratchet-engaging member with the ramp to move the ratchet-engaging member between the first and second positions.

12. The power tool of claim 1, further comprising a spindle coupled for co-rotation with the chuck body, and wherein the hammer mechanism includes
    a first ratchet coupled for co-rotation with the spindle about the central axis, and
    a second ratchet in facing relationship with the first ratchet, wherein the second ratchet is fixed relative to the housing when the hammer mechanism is both enabled and disabled.

13. The power tool of claim 12, further comprising a mode selector assembly including
    a stop member carried by the spindle and rotatable relative to the spindle between a first position, in which the hammer mechanism is enabled, and a second position, in which the hammer mechanism is disabled, and
    an actuator operable to rotate the stop member between the first position and the second position.

14. The power tool of claim 13, wherein, in the first position, the stop member permits the first ratchet to engage the second ratchet, and wherein, in the second position, the stop member prevents the first ratchet from engaging the second ratchet.

15. The power tool of claim 14, further comprising a resilient member positioned between the stop member and the second ratchet to at least partially impart the reciprocating motion of the chuck assembly, and wherein the resilient member is configured to bias the first ratchet and the stop member away from the second ratchet member.

16. The power tool of claim 14, wherein the stop member includes a tab that is engageable with a first portion of the second ratchet when the stop member is in the first position, wherein the tab is engageable with a second portion of the second ratchet when the stop member is in the second position, and wherein the first and second portions of the second ratchet are axially spaced from each other in a direction parallel to the central axis.

17. The power tool of claim 16, wherein the second portion of the second ratchet is disposed nearer the chuck assembly than the first portion of the second ratchet.

18. The power tool of claim 16, wherein the second ratchet includes a stepped surface, wherein the first portion of the second ratchet is configured as a first step oriented substantially normal to the central axis, wherein the second portion of the second ratchet is configured as a second step oriented substantially normal to the central axis, and wherein the second step is disposed nearer the chuck assembly than the first step.

19. The power tool of claim 13, wherein the actuator and the stop member are co-rotatable about the central axis between the first and second positions.

20. A power tool comprising:
a housing;
a motor supported in the housing;
a chuck assembly including
    a chuck body rotatable about a central axis in response to torque received from the motor, and
    a plurality of jaws supported in the chuck body, wherein each of the jaws includes a front portion operable to grasp a tool element and a rear portion positioned outside the chuck body;
a hammer mechanism operable to impart movement to the chuck assembly, in a direction parallel to the central axis, during rotation of the chuck assembly about the central axis, wherein the hammer mechanism includes
    a first ratchet coupled for co-rotation with the chuck body about the central axis, and
    a second ratchet in facing relationship with the first ratchet, wherein the second ratchet is fixed relative to the housing to enable the hammer mechanism, and wherein the second ratchet is co-rotatable with the first ratchet to disable the hammer mechanism;
a mode selector assembly including
    a ratchet-engaging member movable between a first position, in which the hammer mechanism is enabled, and a second position, in which the hammer mechanism is disabled, and
    an actuator operable to move the ratchet-engaging member between the first position and the second position;
    wherein the actuator includes a ramp, and wherein the actuator is rotatable about the central axis to selectively engage the ratchet-engaging member with the ramp to move the ratchet-engaging member between the first and second positions.

21. The power tool of claim 20, further comprising
a carrier rotatable about the central axis in response to torque received from the motor, the carrier supporting the chuck assembly for rotation about the central axis, and
a bearing supporting the carrier for rotation relative to the housing.

22. The power tool of claim 20, wherein the carrier includes one of a projection and an aperture, in which the chuck body includes the other of the projection and the aperture, and in which the projection is slidably receivable in the aperture in response to reciprocating motion between the chuck assembly and the carrier during operation of the hammer mechanism.

23. The power tool of claim 22, further comprising a resilient member positioned between the chuck body and the carrier to at least partially impart the reciprocating motion of the chuck assembly relative to the carrier.

24. The power tool of claim 22, wherein the carrier includes a plurality of apertures through which the rear portions of the respective jaws extend.

25. The power tool of claim 20, further comprising a resilient member biasing the ratchet-engaging member toward one of the first position and the second position.

26. The power tool of claim 20, wherein the ratchet-engaging member is engaged with the second ratchet to fix the second ratchet relative to the housing when the ratchet-engaging member is in the first position.

27. A power tool comprising:
a housing;
a motor supported in the housing;
a chuck assembly including
    a chuck body rotatable about a central axis in response to torque received from the motor, and
    a plurality of jaws supported in the chuck body, wherein each of the jaws includes a front portion operable to grasp a tool element and a rear portion positioned outside the chuck body;
a hammer mechanism operable to impart movement to the chuck assembly, in a direction parallel to the central axis, during rotation of the chuck assembly about the central axis;
a spindle coupled for co-rotation with the chuck body, wherein the hammer mechanism includes
    a first ratchet coupled for co-rotation with the spindle about the central axis, and
    a second ratchet in facing relationship with the first ratchet, wherein the second ratchet is fixed relative to the housing when the hammer mechanism is both enabled and disabled; and
a mode selector assembly including
    a stop member carried by the spindle and rotatable relative to the spindle between a first position, in which the hammer mechanism is enabled, and a second position, in which the hammer mechanism is disabled, and
    an actuator operable to rotate the stop member between the first position and the second position.

28. The power tool of claim 27, wherein, in the first position, the stop member permits the first ratchet to engage the second ratchet, and wherein, in the second position, the stop member prevents the first ratchet from engaging the second ratchet.

29. The power tool of claim 28, further comprising a resilient member positioned between the stop member and the second ratchet to at least partially impart the reciprocating motion of the chuck assembly, and wherein the resilient member is configured to bias the first ratchet and the stop member away from the second ratchet member.

30. The power tool of claim 28, wherein the stop member includes a tab that is engageable with a first portion of the second ratchet when the stop member is in the first position, wherein the tab is engageable with a second portion of the second ratchet when the stop member is in the second position, and wherein the first and second portions of the second ratchet are axially spaced from each other in a direction parallel to the central axis.

31. The power tool of claim 30, wherein the second portion of the second ratchet is disposed nearer the chuck assembly than the first portion of the second ratchet.

32. The power tool of claim 30, wherein the second ratchet includes a stepped surface, wherein the first portion of the second ratchet is configured as a first step oriented substantially normal to the central axis, wherein the second portion of the second ratchet is configured as a second step oriented substantially normal to the central axis, and wherein the second step is disposed nearer the chuck assembly than the first step.

33. The power tool of claim 27, wherein the actuator and the stop member are co-rotatable about the central axis between the first and second positions.

* * * * *